Oct. 10, 1950 O. H. SCHADE 2,525,102

TELEVISION SYNCHRONIZING SIGNAL GENERATOR

Filed July 1, 1947 11 Sheets-Sheet 1

INVENTOR
Otto H. Schade
BY Samuel B. Smith
ATTORNEY

TELEVISION SYNCHRONIZING SIGNAL GENERATOR

Filed July 1, 1947 11 Sheets-Sheet 2

INVENTOR
Otto H. Schade
BY Samuel B. Smith
ATTORNEY

TELEVISION SYNCHRONIZING SIGNAL GENERATOR

Filed July 1, 1947 11 Sheets-Sheet 3

INVENTOR
Otto H. Schade
BY Samuel B. Smith
ATTORNEY

TELEVISION SYNCHRONIZING SIGNAL GENERATOR

INVENTOR
Otto H. Schade
BY Samuel B. Smith
ATTORNEY

Oct. 10, 1950 O. H. SCHADE 2,525,102

TELEVISION SYNCHRONIZING SIGNAL GENERATOR

Filed July 1, 1947 11 Sheets-Sheet 5

INVENTOR
Otto H. Schade
BY Samuel B. Smith
ATTORNEY

TELEVISION SYNCHRONIZING SIGNAL GENERATOR

Filed July 1, 1947 11 Sheets-Sheet 6

INVENTOR
Otto H. Schade
BY Samuel B. Smith.
ATTORNEY

Oct. 10, 1950 O. H. SCHADE 2,525,102

TELEVISION SYNCHRONIZING SIGNAL GENERATOR

Filed July 1, 1947 11 Sheets-Sheet 7

INVENTOR
Otto H. Schade
BY Samuel B. Smith
ATTORNEY

Oct. 10, 1950 O. H. SCHADE 2,525,102

TELEVISION SYNCHRONIZING SIGNAL GENERATOR

Filed July 1, 1947 11 Sheets-Sheet 8

INVENTOR
Otto H. Schade
BY Samuel B. Smith
ATTORNEY

INVENTOR.
Otto H. Schade
BY Samuel B. Smith
ATTORNEY

Oct. 10, 1950 O. H. SCHADE 2,525,102

TELEVISION SYNCHRONIZING SIGNAL GENERATOR

Filed July 1, 1947 11 Sheets-Sheet 10

INVENTOR.
Otto H. Schade
BY Samuel B. Smith
ATTORNEY

Oct. 10, 1950 O. H. SCHADE 2,525,102

TELEVISION SYNCHRONIZING SIGNAL GENERATOR

Filed July 1, 1947 11 Sheets-Sheet 11

INVENTOR
Otto H. Schade
BY Samuel B. Smith
ATTORNEY

Patented Oct. 10, 1950

2,525,102

UNITED STATES PATENT OFFICE 2,525,102

TELEVISION SYNCHRONIZING SIGNAL GENERATOR

Otto H. Schade, West Caldwell, N. J., assignor to Radio Corporation of America, a corporation of Delaware Application July 1, 1947, Serial No. 758,457

12 Claims. (Cl. 250—36)

Figure 1:
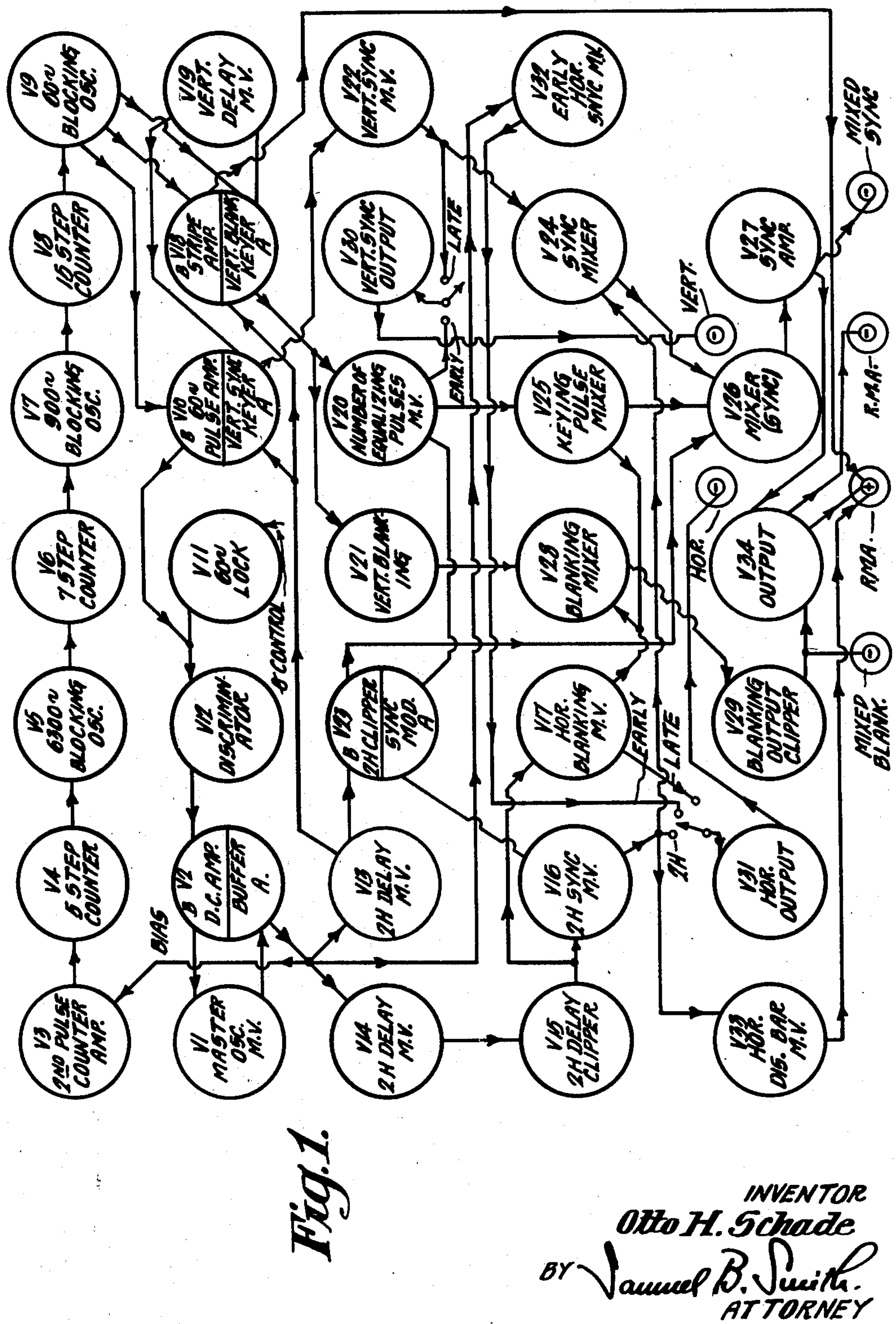

This invention relates to an improvement in television systems, and more particularly, to a system for generating impulses or synchronizing signals that are used for maintaining synchronous operation of one or more television receivers with a television transmitter. In addition to the generation of the synchronizing signals, the circuit arrangement of the present invention also provides a source of television blanking signals and a choice or selection of signals that may be utilized for triggering the sweep of a monitoring oscilloscope. In addition, the circuit arrangement also provides a source of signals of different frequencies that may be used to produce a pattern on an image producing tube for test purposes. These images may be presented in the form of vertical or horizontal bars.

A synchronizing signal generator to be associated with a commercial transmitter must be capable of generating a waveform of such a character that it will fully comply with the specifications of the National Television Systems Committee of the Radio Manufacturers Association and also meet the requirements of the Federal Communications Commission. A sync signal complying with these specifications is generally referred to as an RMA sync signal.

In general, the RMA sync signal includes horizontal sync impulses of a predetermined duration and vertical sync impulses of a predetermined and greater duration. Immediately preceding each vertical synchronizing impulse and immediately following each vertical synchronizing impulse, for predetermined time intervals, equalizing impulses are specified and these equalizing impulses are of double horizontal sync impulse rate but are each of a shorter time duration. Furthermore, the vertical synchronizing impulse is provided with slots of a predetermined width and of double the horizontal sync frequency. Certain tolerances are permissible in the RMA sync signal and it is of course necessary that the wave form generated by the sync generator remain well within these tolerances.

In the design of a sync generator it is essential that the circuit arrangement be such as will provide inherent stability and will be capable of continuous operation without any appreciable deviation in the waveform supplied by the generator. Furthermore, the generator must be conveniently and readily adjusted to provide the desired waveform, and, once the generator is adjusted, it is preferable that no further adjustments be necessary.

Circuit arrangements have heretofore been devised for generating the television sync signal and examples of these circuit arrangements are to be found in the patent to Bedford, No. 2,258,943, issued on October 14, 1941, and in the patent to Schlesinger, No. 2,350,536, issued June 6, 1944. Another example of a circuit arrangement for generating the synchronizing signal, as well as other control voltage variations, is to be found in the application of Schoenfeld, Serial No. 682,738, filed July 11, 1946.

The present invention and circuit arrangement for generating television synchronizing and blanking signals differs from those referred to above in many respects. Furthermore, the present invention is relatively simple in the manner in which the final waveform is produced, yet in spite of this simplicity, the circuit arrangement is inherently stable and produces a synchronizing signal that is accurate in waveform and in which the phase relationship of the various voltage variations are correctly related with respect to each other.

In a television receiver the response of the deflection generators for controlling the horizontal and vertical deflections of the cathode ray beam in the image producing tube responds invariably in all different types of receivers to the instant of occurrence of the leading edge of the synchronizing impulses. It is therefore, material that the leading edge of all impulses, and all voltage variations of the sync signal waveform that result in an increase in carrier amplitude, be properly phased with respect to each other in order that proper synchronization at a receiver may result. Furthermore, maintenance of the proper phase relationship is essential in order that a properly interlaced pattern may be scanned at the image area of the receiver image producing tube. This exacting phase relationship of the leading edges of all impulses (and the trailing edge of all slots in the vertical sync impulses) is accomplished in the present invention by generating a series of regularly recurring impulses of double line (or double the horizontal deflection frequency), the series of impulses having a predetermined time duration and fixed rate of occurrence. This series of impulses is then used to trim the leading edges of another series of impulses so that the resulting series of impulses will have their leading edges properly related to each other in time and phase relationship.

The circuit arrangement of the present invention employs a plurality of multivibrators, which in most instances are normally biased against self-operation but which preform cycles of operation in response to the receipt of keying impulses. The multivibrators are provided with adjustable elements or parameters whereby the time duration of the impulses supplied thereby may be requested or controlled.

In the standard RMA sync signal, the horizontal synchronizing impulses have a duration equal to twice the duration of the double frequency equalizing impulses that immediately precede and follow the vertical synchronizing impulses. In the present arrangement the same multivibrator supplies voltage variations which later result in the formation of both the horizontal synchronizing impulses and the equalizing impulses. Since these impulses are of different lengths, the time duration of the voltage variations supplied by the multivibrators referred to above is cyclically altered at the television field repetition rate. This is accomplished by electronically and sequentially altering the effective magnitude of at least one of the circuit elements associated with the multivibrator. When the magnitude of this circuit element is cyclically altered, the time duration of the impulses supplied by the multivibrator is also cyclically altered.

In the present invention provision is made whereby the time duration that exists between the leading edge of the horizontal blanking impulses and the leading edge of the horizontal synchronizing impulses is fixed and is in accordance with the prescribed standards. In other words the time duration of the "front porch" of the sync signal is definitely fixed. In a similar manner the "back porch" portion, i. e., the time interval that exists between the termination of the horizontal synchronizing impulses and the termination of the horizontal blanking impulses, is also fixed.

It is therefore, one purpose of the present invention to provide a new and improved sync signal generator for use at a television transmitter, the waveform of the signal supplied by the generator being in accordance with the prescribed RMA standards.

Another purpose of the present invention resides in the provision of television sync signal generator in which the leading edge of all impulses are properly related to each other in both time and phase relationship.

Still another purpose of the present invention is the provision of a television sync generator in which the time duration of all impulses is definitely fixed and is in accordance with the RMA standards.

A still further purpose of the present invention resides in the provision of a television sync generator in which the instant of occurrence of the leading edge of all impulses is determined by a single series of impulses of constant frequency and time duration.

Still another purpose of the present invention resides in a television sync signal generator in which the waveform supplied by the generator may be readily adjusted, yet once the adjustments have been made the generator will remain stable in its operation.

Another purpose of the present invention resides in the provision of a multivibrator in a television sync signal generator, with circuit arrangements associated therewith for cyclically altering time duration of the impulses supplied thereby at the television field or vertical deflection rate.

Still another purpose of the present invention resides in the provision of a television sync generator for supplying in addition to the RMA standard synchronizing signal, the prescribed horizontal and vertical blanking impulses, as well as impulses for synchronizing a monitoring oscilloscope, said impulses being selectably obtainable in a plurality of rates and of different phase relationships with respect to the sync signals.

A still further purpose of the present invention resides in the provision of a television sync generator from which may be obtained, if desired, bar signals for producing horizontal or vertical bars on the viewing screen of a monitor kinescope.

Figure 3A:
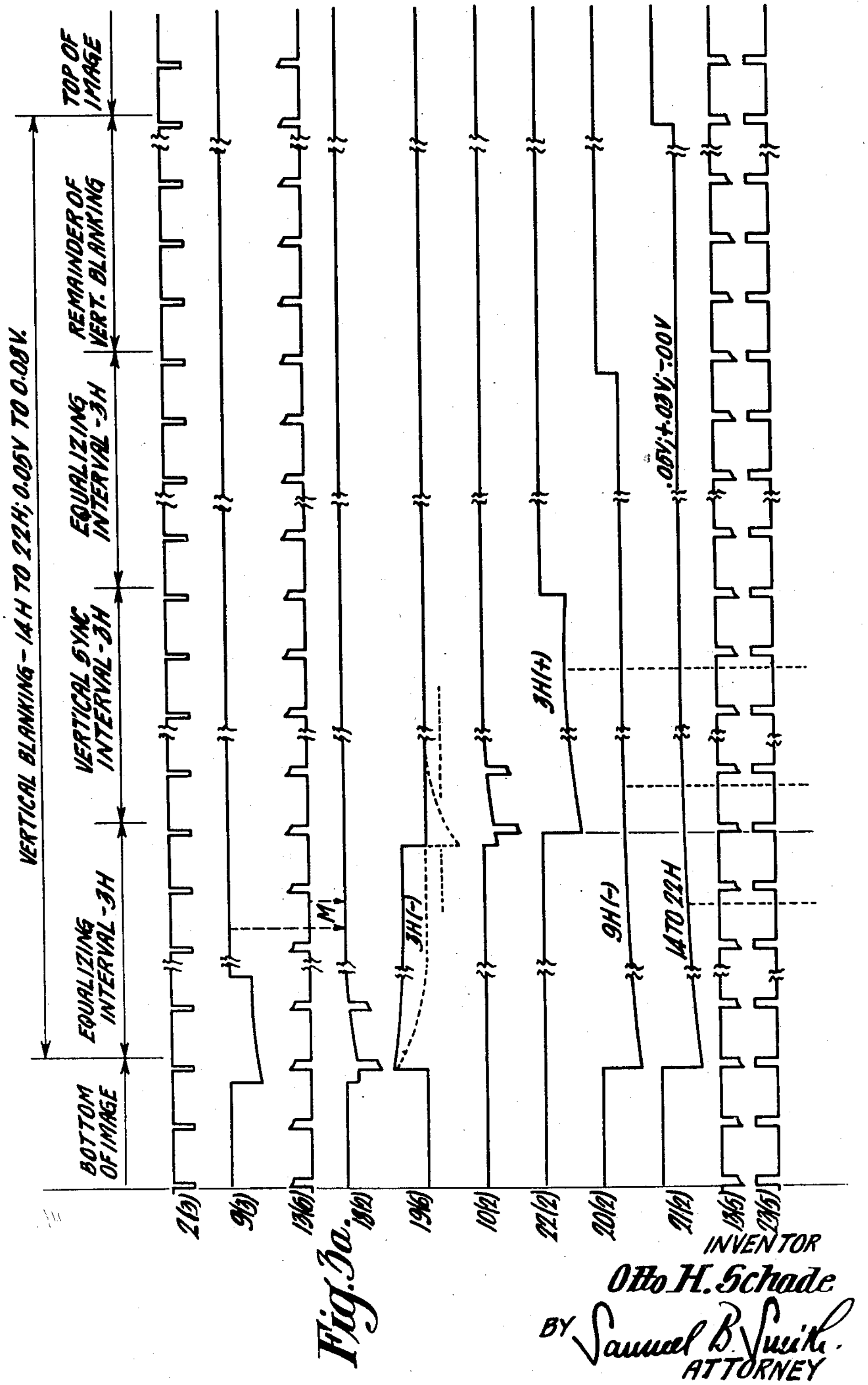
Figure 3B:
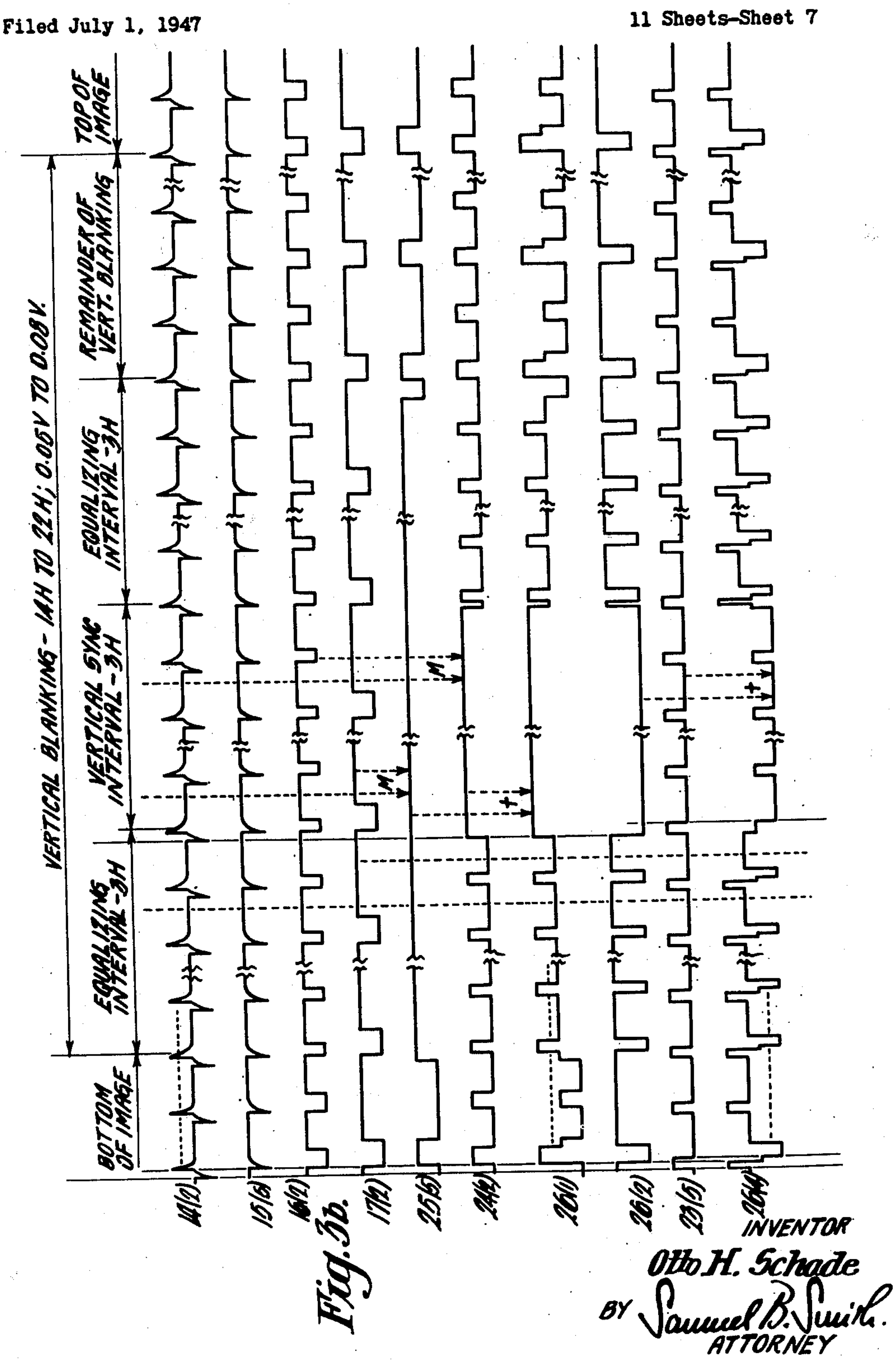
Figure 3C:
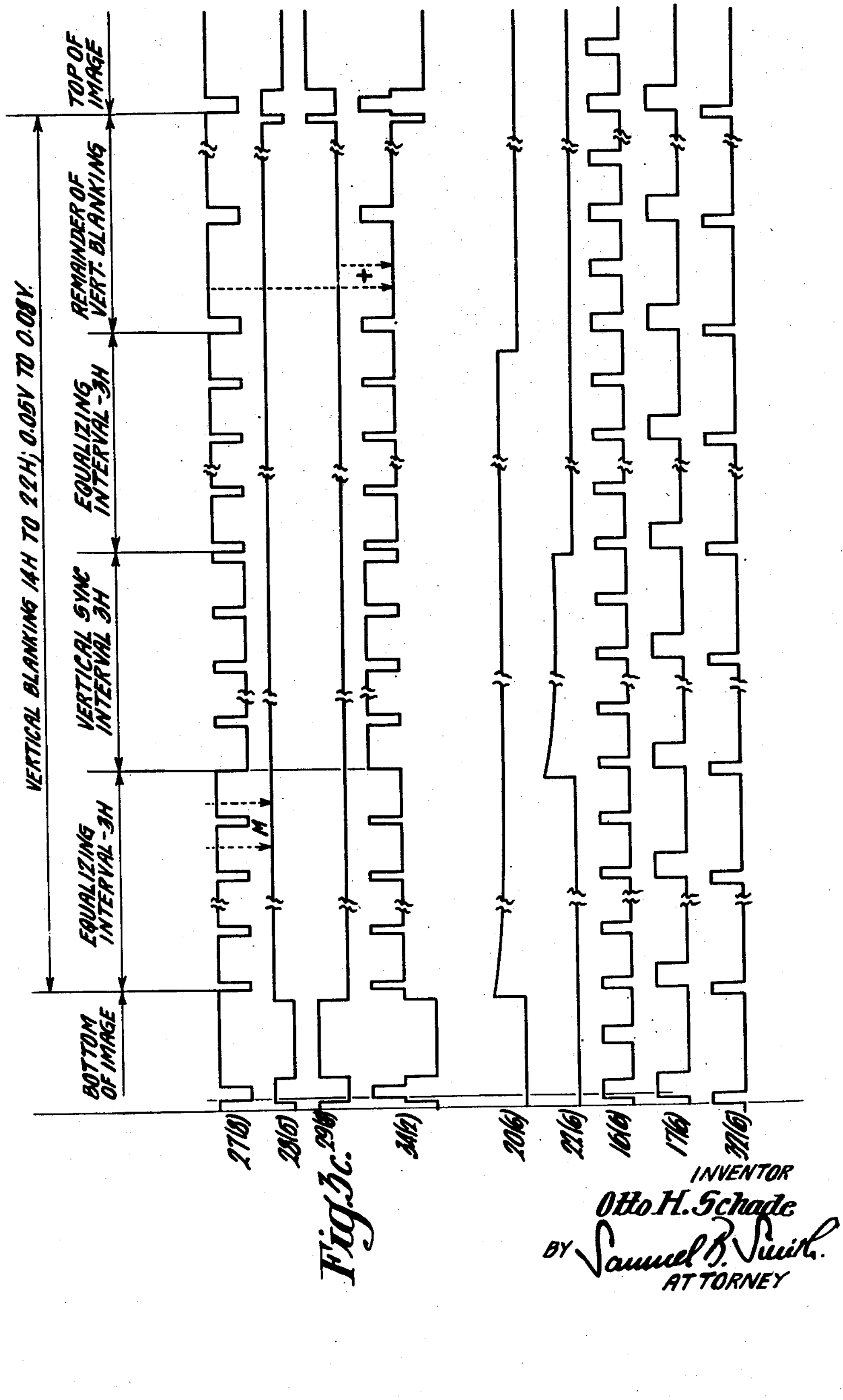
Figure 4A:
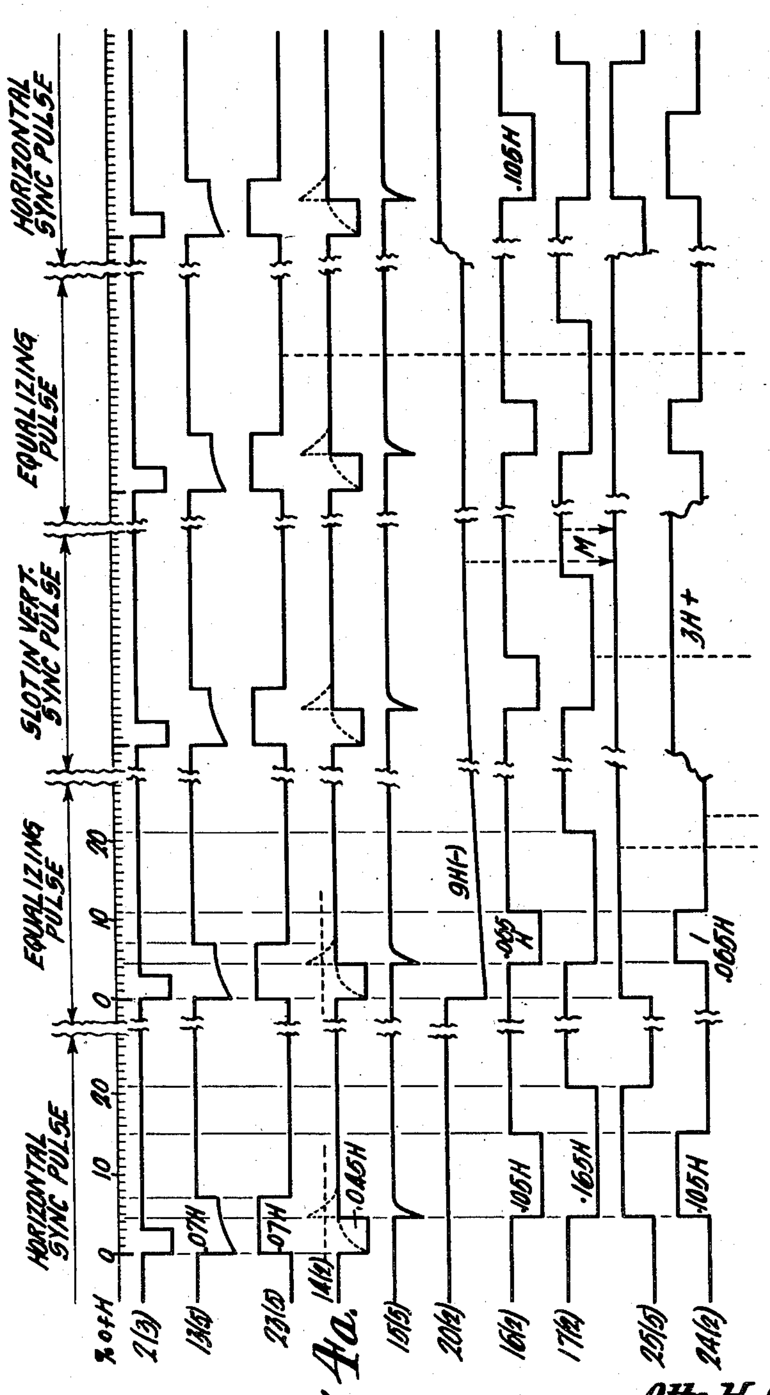
Figure 4B:
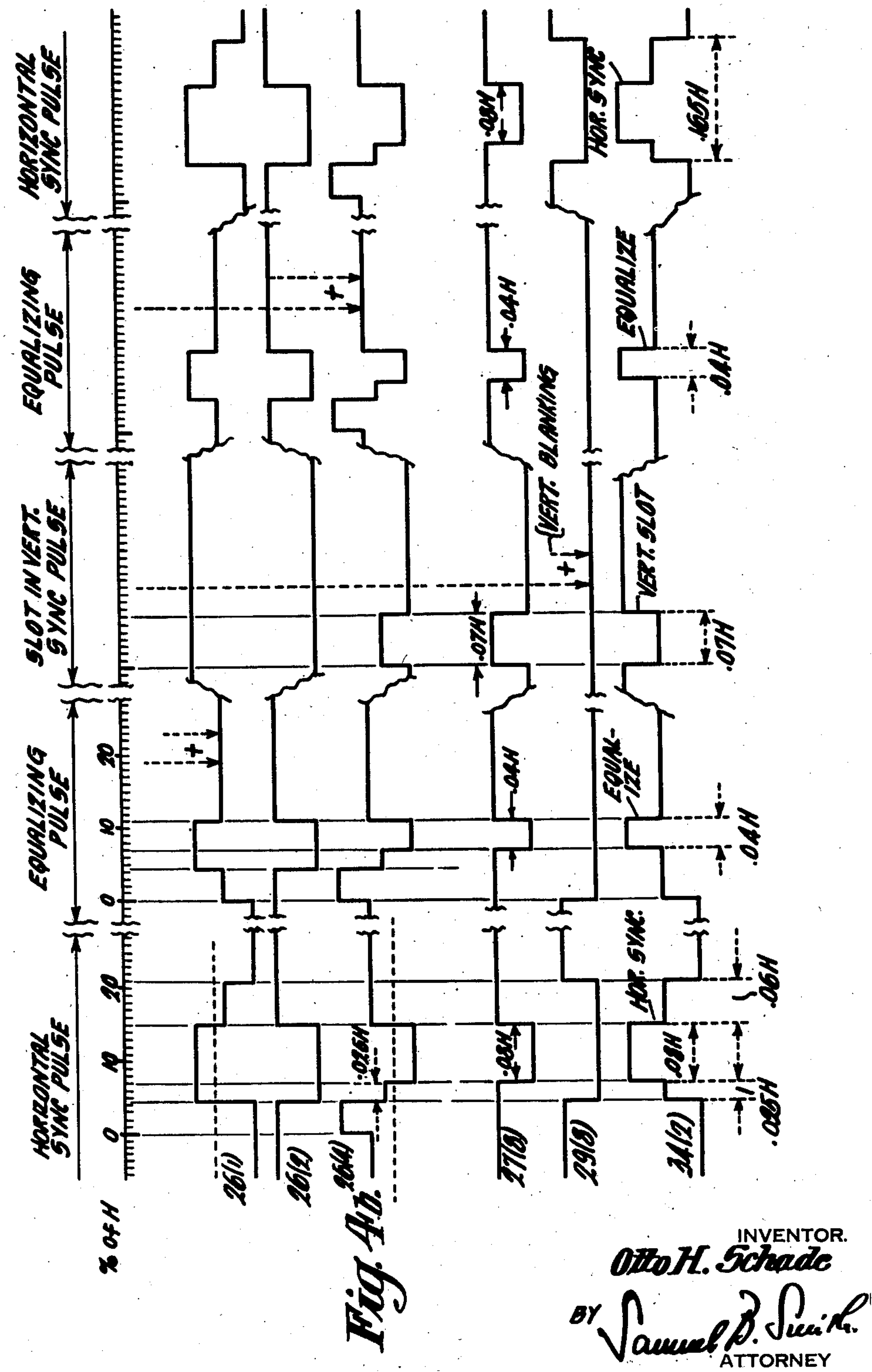

Various other purposes and advantages of the present invention will become more apparent to those skilled in the art from the following detailed description, particularly when considered in connection with the drawings in which:

Figure 1 is a blocked diagram of a preferred form of the present invention;

Figures 2*a*, 2*b*, 2*c* and 2*d*, taken together, show a schematic diagram of a preferred form of the invention;

Figures 3*a*, 3*b* and 3*c* represent a series of curves used in explaining the operation of the system;

Figures 4*a* and 4*b* show a further series of curves in which the time axis has been sufficiently enlarged to more accurately illustrate the voltage variations that appear at various points in the circuit arrangement; and Figures 5*a*, 5*b*, 5*c* and 5*d* represent the present recommended RMA television sync signal with the tolerances indicated.

The circuit arrangement of the present invention includes a total of 34 electron tubes, the majority of which are dual purpose or twin tubes. For accurately illustrating and describing the present invention, the particular tube types are indicated but it is to be understood that different types of tubes may be used and furthermore, it is to be understood that where twin or dual purpose tubes are employed, similar tubes including only a single set of elements may be employed without in any way departing from the spirit of the invention.

The complete schematic circuit diagram of the present invention is represented by Figures 2*a*, 2*b*, 2*c* and 2*d* but for convenience the block diagram of Figure 1 has been supplied in order to more readily indicate the relationship of the various tubes of the circuit. The circles of the block diagram of Figure 1 represent the tubes of the complete schematic diagram of Figures 2*a* through 2*d*, and the relative locations of these circles corresponds to the same relative locations of the tubes in the complete schematic circuit diagram. Figure 1 shows by way of simple lead lines the direction of flow of the produced voltage variations so that by referring to Figure 1, one may readily ascertain from what source a particular tube derives its driving impulses and to what tube or tubes it supplies voltage variations.

In describing the operation of the system shown in Figures 2*a*, 2*b*, 2*c* and 2*d*, repeated reference will be made to the curves of Figures 3*a*, 3*b* and 3*c* as well as Figures 4*a* and 4*b*. The particular curves in these figures are each identified by number designations. These numbers are indicative of the particular tube, and the electrode of that tube, where the voltage variation represented by the curve is to be found. For example, if the curve carries the numeral designation 19(6), this means that the particular curve represents the voltage variation present at pin 6 of tube V—19. The key location is shown associated with each tube of the schematic diagram, and as is well known to those skilled in the art, the particular tube pins number in a clockwise fashion from the key. Furthermore, in the curves shown in Figures 3a, 3b and 3c, as well as Figures 4a and 4b, vertical dotted lines will be observed with an addition designation "+" associated therewith or with a mixing designation "M" associated therewith. These dotted vertical lines therefore indicate what previously produced voltage variations are combined, either by addition or mixing, to produce a particular resultant voltage variation. In some instances the voltage variations are merely added together, whereas in others they are mixed in an electron stream by the injection of two voltage variations into two different electrodes of an electron stream, as for example, the cathode and control electrode of a tube. Also in connecting with the curves of Figures 3a, 3b, 3c, 4a and 4b the time axis is broken in several points in order that as complete information may be presented as is possible in the space available.

In describing the present invention it will be assumed that the television line frequency or horizontal deflection rate is 15,750 cycles per second and also that the television field frequency or vertical deflection rate is 60 cycles per second. In a double interlaced system, this means that the frame rate is 30 cycles per second with 262½ lines per field or 525 lines per frame. This is in accordance with present standards, however, should the standards be changed to increase or decrease any of the deflection rates the flexibility of the present invention is sufficient to accommodate any reasonable change and is also sufficient to permit adjustments to accommodate any reasonable change in pulse length or phase relationship. It is to be understood, however, that although specific frequencies may be actually referred to, it is not intended that the present invention be limited to such frequencies specifically, particularly in view of the fact that the flexibility of the sync generator is sufficient to accommodate and generate various other prescribed frequencies.

In order that accurate interlacing may be accomplished, it is necessary that the vertical or field synchronizing impulses be properly related, both in frequency and phase to the line or horizontal synchronizing impulses. Furthermore, for ease of operation, particularly in so far as the receiver is concerned, it is desirable that the vertical or field repetition rate be related to the 60 cycle power line from which energy is obtained. There should preferably be no lack of synchronism between the vertical synchronizing impulse and the 60 cycle power line and furthermore, a predetermined phase relationship should exist between the two with substantially no "hunting."

Figure 2A:
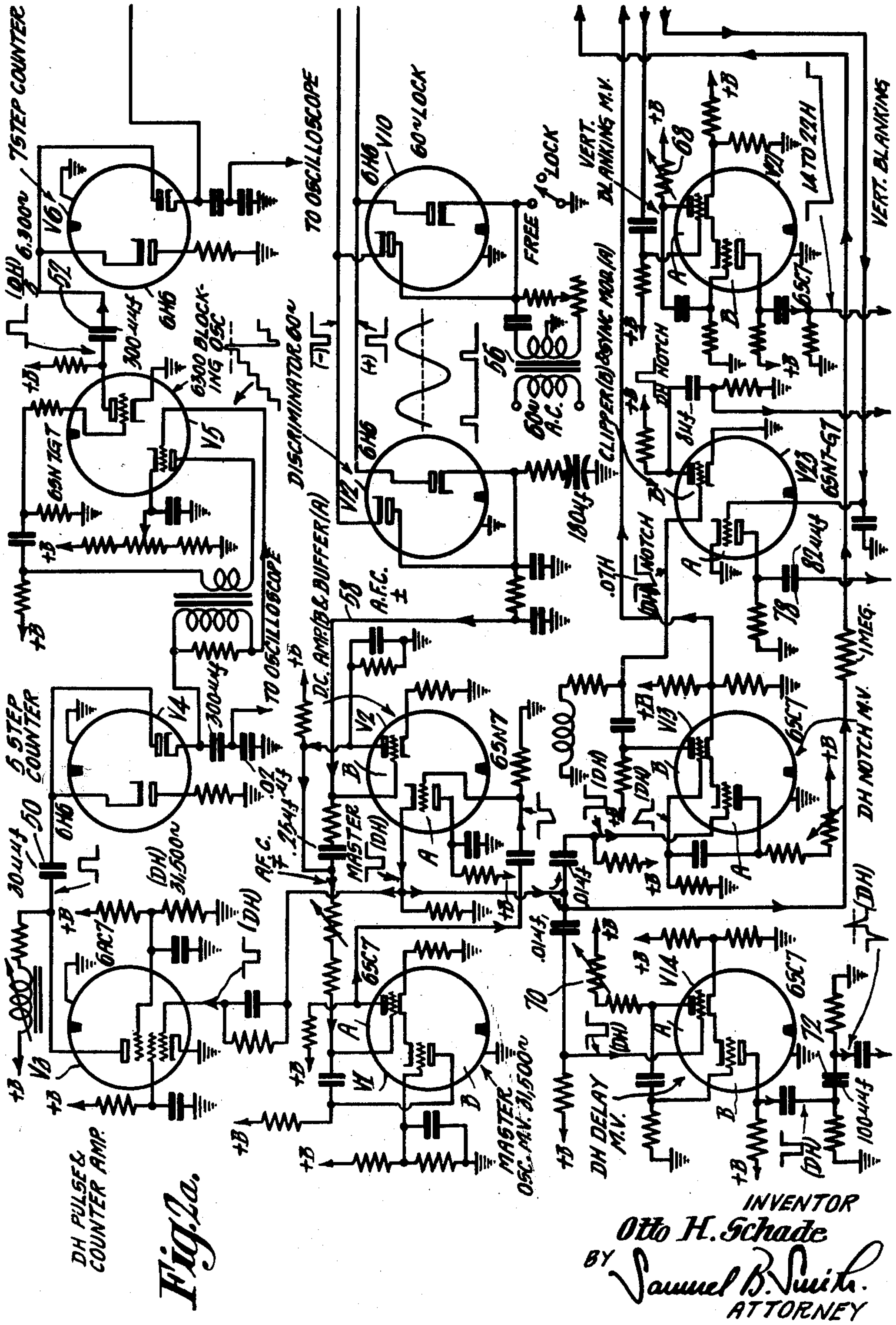
Figure 2B:
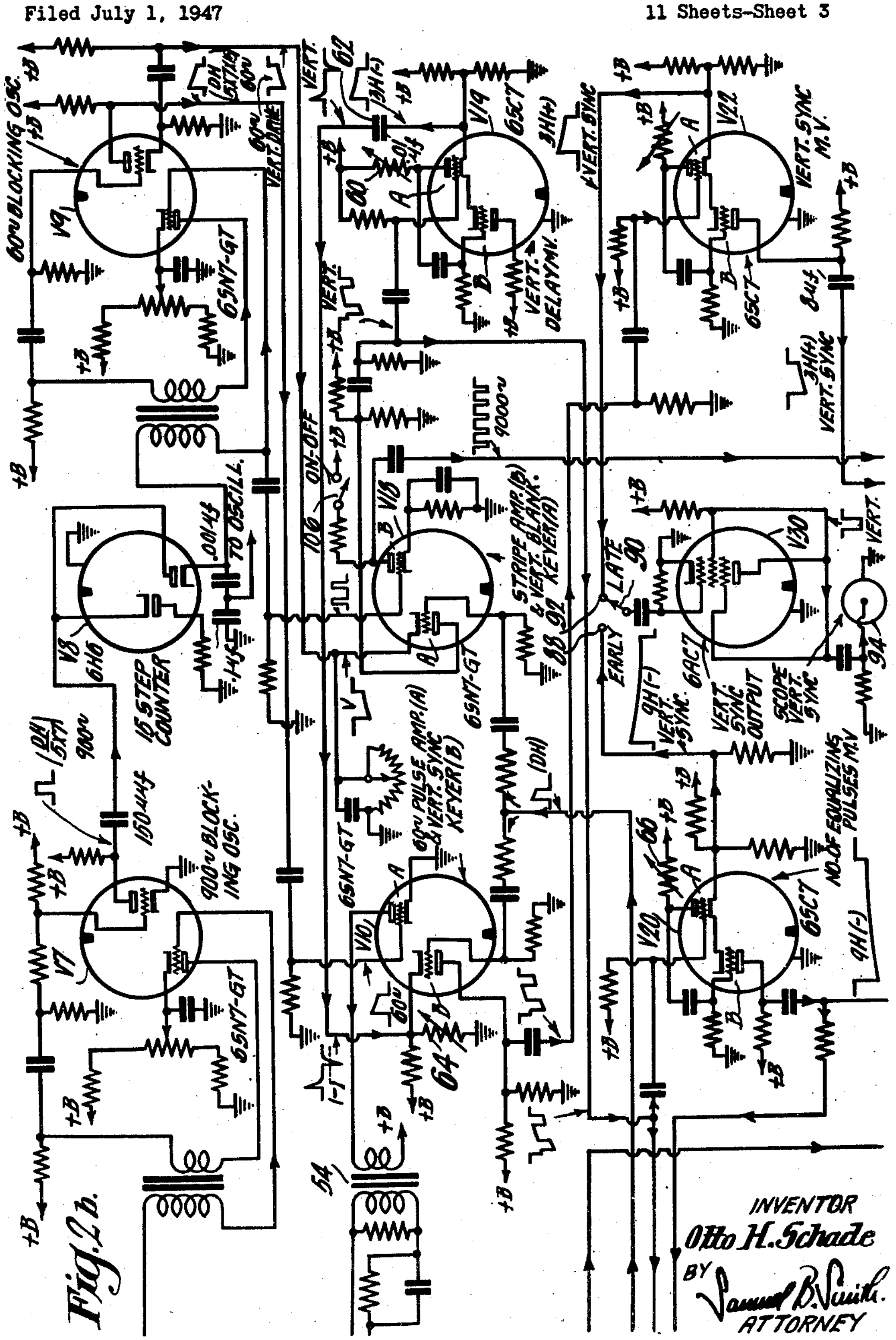

In order that this relationship may exist, a master oscillator tube V—1 (Figure 2a) is provided and the circuit parameters associated with this tube are such that it oscillates at a frequency corresponding to double the horizontal deflection rate, which is the rate of occurrence of the equalizing impulses that both precede and follow the vertical synchronizing impulses. This frequency is 31,500 cycles per second and the oscillator is in the form of a multivibrator. Impulses from the anode of section A of the master oscillator tube V—1 are supplied to the control electrode of section A, tube V—2 (Figure 2a), which functions as a buffer tube. The output from this tube, as derived from the cathode, is a series of negative impulses of double line frequency. This voltage variation is represented by curve 2(3) of both Figures 3a and 4a. The duration of these negative impulses is more or less immaterial but may for example be for the order of 0.03 H, as indicated in Figure 4a. In other words, their duration may be 3% of the time interval between successive horizontal synchronizing impulses. These negative impulses from the buffer tube V—2 (section A) are supplied to a notching multivibrator V—13 (Figure 2a), a delay multivibrator V—14 (Figure 2a) and to an early horizontal sync multivibrator V—32 (Figure 2d). The function of these tubes will be explained later. In addition the same negative impulses are also supplied to a counter amplifier tube V—3 (Figure 2a). The positive impulses from the anode of this counter amplifier are applied, by way of the condenser 50, to a 5 step counter including tube V—4 (Figure 2a). This counter functions in a known manner to reduce the frequency from 31,500 pulses per second to 6,300 pulses per second, which frequency is available at the blocking oscillator tube V—5 (Figure 2a). The output from this tube is then applied to a second counter which divides by seven, this counter being tube V—6 (Figure 2a), so that a frequency of the order of 900 cycles per second is present at the blocking oscillator tube V—7 (Figure 2b). The output from this blocking oscillator is similarly applied to a 15 step counter tube V—8 which causes the blocking oscillator tube V—9 to pulse at a frequency of 60 cycles per second.

The output from the cathode of the blocking oscillator V—9 is then a negative impulse of 60 cycles per second frequency which may be termed the vertical master drive pulse. The waveform of this pulse is represented in Figure 3a, by the curve 9(3) and this pulse may have a duration of the order of 2 H. This negative pulse is then employed to control various multivibrators and other tubes for the production of certain portions of the complete sync signal waveform. From the anode of the same portion of the blocking oscillator tube V—9, positive impulses of the same frequency and duration are available and these are applied to a 60 cycle pulse amplifier, section A of tube V—10 (Figure 2b). The output from this amplifier tube is then applied by way of transformer 54 to the plates and anodes of a phase comparison net work including tubes V—11 and V—12 (Figure 2a). The operation of such a discriminator or phase comparison net work is well known to those skilled in the art and an example of such an arrangement is shown and described in the Bedford patent referred to above. The 60 cycle sine wave power line frequency for comparison may be applied to tube V—11 by way of transformer 56 or the transformer may be eliminated and the 60 cycle sine wave of the power line derived from the heater terminals of the tubes of the sync generator.

The output from the discriminator supplies, at conductor 58, a direct current potential having a polarity and intensity depending upon the phase relationship between the 60 cycle impulses from the blocking oscillator tube V—9 (Figure 2b) and the 60 cycle sine wave of the power line. This voltage variation or automatic frequency control (AFC) is then applied to a direct current amplifier tube, section B of tube V—2. The output from this tube is then applied to the control electrode of section A of the master oscillator tube V—1 to alter its frequency of operation to maintain a predetermined phase relationship between the sync generator and the power line frequency. This automatic frequency control is somewhat conventional and is not believed that any further explanation is necessary.

As indicated above, the master oscillator impulses 2(3) are applied to the multivibrator V—13 by impressing the impulses upon the control grid of section A of this tube. Two series of impulses may then be derived from section B of the notching multivibrator tube V—13, one series being of negative polarity from the anode of section B and the other series being of positive polarity from the common cathodes of the tube. The parameters of this tube are so adjusted (by regulating the adjustable load impedance of section A) that the duration of the impulses of each of these series correspond to approximately 0.07 H. The waveform available from the anode is represented by curve 13(5) of Figure 4a while the waveform from the cathode is represented by curve 13(6) of Figure 3a. The duration of this impulse is material, as will be apparent later on. The duration, as shown in Figure 4a, should be of the order of 0.07 H (this time interval, incidentally, corresponds to the recommended width of the slots in the vertical synchronizing impulse of the RMA sync signal which is 0.07 H, ± 0.01 H, see Figure 5c).

The negative polarity 60 cycle impulses of waveform 9(3) of (Figure 3a) are applied to the cathode of section A of the vertical blanking keyer portion of tube V—18 (Figure 2b). Also positive impulses represented by the curve 13(6) and of double line frequency are applied to the control electrode of this section A of tube V—18. The biasing of this section of the tube is such that the tube will not draw current in response to the impulse applied to the control electrode, unless there is simultaneously applied to the cathode a negative impulse as represented by curve 9(3) of (Figure 3a). As a result of the application of both these waveforms to this electron stream, there appears at the anode of section A of tube V—18 a voltage variation as represented by curve 18(2) of (Figure 3a). When section A of tube V—18 is keyed into conduction by the negative impulses of field frequency applied to the cathode thereof, negative pulses appear at the anode corresponding to the positive pulses of double horizontal frequency that are applied to the control electrode. This voltage variation, as represented at 18(2) of (Figure 3a), is then applied to the control electrode of section A of the vertical delay multivibrator tube V—19 (Figure 2b) and also to two other multivibrator tubes V—20 (Figure 2b) and V—21 (Figure 2a). The purpose of these latter two multivibrators will be explained later.

From the cathode of the vertical delay multivibrator tube V—19 a positive impulse is available, the front edge of which coincides in time with one of the notching impulses from tube V—13 (curve 13(6)). These positive impulses of field or vertical deflection frequency are represented by the curve 19(6) of Figure 3a. The duration of these impulses is controllable by the adjustable load resistance 60 associated with the multivibrator tube V—19 and the duration is adjusted to be slightly less than 3 H. These impulses are differentiated by a relatively small condenser 62 and the resultant voltage variation is represented by dotted lines associated with the curve 19(6) of (Figure 3a).

Figure 5A:
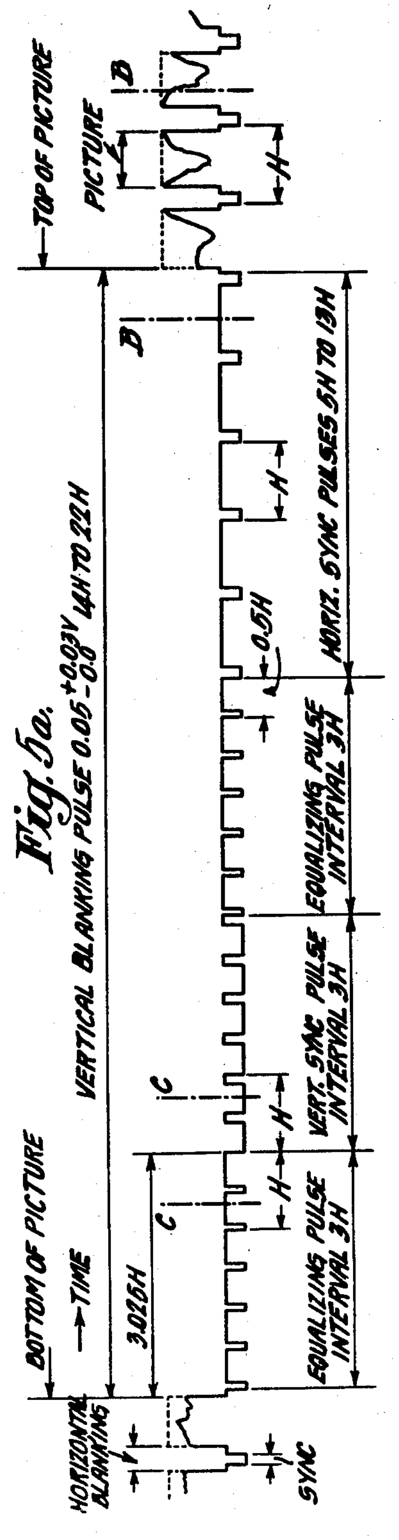
Figures 5B, 5C, 5D:
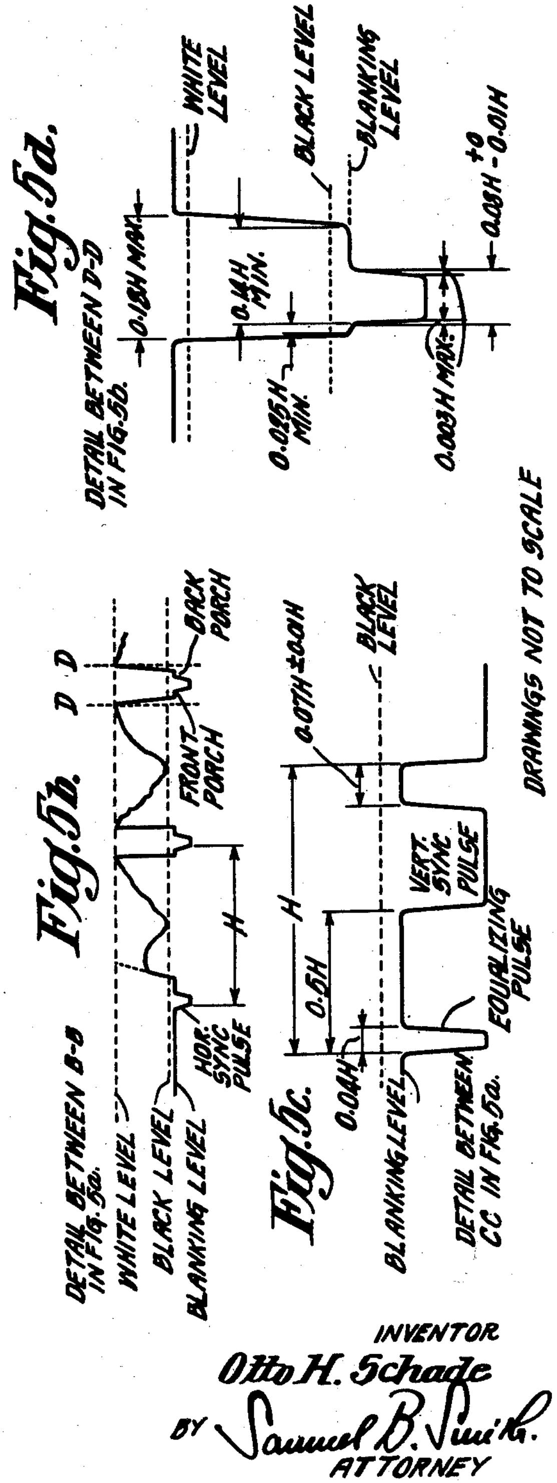

The reason for the impulse interval of curve 19(6) to corresponding to approximately 3 H is because this is the interval during which six double line frequency equalizing impulses are transmitted prior to the commencement of the vertical synchronizing impulses in the RMA sync signal (see Figure 5a). The interval is made slightly less than 3 H for a reason that will now be explained. Since the differentiated waveform is applied to a vertical sync keyer, section B of tube V—10, and the bias of this tube is such that it responds only to the negative excursion of the differentiated voltage variation, it is desired that the negative excursion start just before a notching impulse of curve 13(6). For this reason the impulse of curve 19(6) is made slightly less than 3 H in duration. Also, applied to the control electrode of this same section B of tube V—10 are the same positive plurality notching impulses represented by curve 13(6) of Figure 3a. The bias of the vertical sync keyer, section B of tube V—10 is such that this tube does not respond to the positive impulses applied to the grid thereof in the absence of negative impulses at the cathode. Biasing is adjusted by the cathode resistor 64 and by proper choice of the grid resistor. When both the control electrode and cathode are modulated simultaneously, however, negative impulses such as represented by the curve 10(2) of Figure 3a are available. This waveform and the operation of the keyer is similar to the operation of section A of tube V—18, the vertical blanking keyer. These negative impulses from the vertical sync keyer, section B of tube V—10, are then applied to the control electrode of section A of the vertical sync multivibrator V—22 (Figure 2b), to produce at the anode of section B thereof a negative impulse of vertical deflection frequency having a duration of slightly more than 3 H. This voltage variation is represented by the curve 22(2) of Figure 3a. It will be observed that the leading edge of the waveform 22(2) coincides with the leading edge of one of the notching impulses of waveform 13(6) and the voltage variation of waveform 19(6) was made slightly less than 3 H to obtain this relationship. Actually, the leading edge of the waveform 22(2) does not precisely coincide with the leading edge of one of the notching impulses of curve 13(6) since a very slight triggering delay exists, but for all practical purposes this can be ignored, especially since the front and back edges of the pulse represented at 22(2) is trimmed to assure accurate phasing as will be later described. The voltage variation from the vertical sync multivibrator tube V—22, as represented by curve 22(2), corresponds to the prescribed duration of the vertical synchronizing impulses and the early start (by nearly one notching pulse width) as well as the slight duration to the 3 H interval is to permit proper trimming of the front edge and slotting at the final slot in the vertical sync signal, as will become apparent later.

As indicated above, the voltage variations from the vertical blanking keyer, section A of tube V—18, were also applied to tube V—20 (Figure 2b) that determines the number of equalizing impulses, and to tube V—21 (Figure 2a) that produces the vertical blanking impulse. Both of these tubes (multivibrators) responds to the first negative impulse represented at curve 18(2) and from the anode of section B of tube V—20 is derived a negative impulse of field or vertical deflection frequency having a duration of slightly less than (H). This voltage variation is represented at curve 20(2) of Figure 3*a*. The RMA sync signal specifies a vertical sync interval corresponding to a time interval of 3 H and this interval is preceded and followed by an equalizing interval, each of a duration of 3 H, so that a total time from the beginning of the equalizing interval preceding the vertical sync pulse to the end of the equalizing interval following the vertical sync pulse is 9 H (see Figure 5*a*). The vertical blanking interval extends beyond the termination of the final equalizing interval and may be from an additional 5 H to 13 H, according to the RMA standards.

From the anode of section B of tube V—21 the vertical blanking multivibrator, a negative impulse of field or vertical deflection frequency is available as represented by the curve 21(2) of Figure 3*a*. The duration of this pulse is adjusted within the limits of 14 to 22 H (i. e., 0.05 V, +0.03 V, −0.00 V). The length of the 9 H pulse 20(2) is adjustable by means of resistance 66 while the length of the vertical blanking pulse 21(2) is determined by an adjustment of resistance 68 associated with multivibrator tubes V—20 and V—21, respectively.

From the above it may, therefore, be seen that already the vertical sync interval has been determined as well as the preceding and succeeding equalizing intervals and also the vertical blanking interval. Some reshaping and rephasing is necessary and this will be explained later. The development of the horizontal synchronizing impulses, the horizontal blanking impulses and other relative voltage variations will now be considered.

As indicated above, the notching multivibrator tube V—13 (Figure 2*a*) supplies, from the anode of section B of that tube, notching impulses of negative polarity. These are applied to a clipper tube, section B of tube V—23 (Figure 2*a*). The impulses supplied by tube V—13 are not flat topped, as is indicated by the curves 13(5) of Figures 3*a* and 4*a*, so that the function of section B of tube V—23 is to amplify and clip the pulses to produce positive impulses of double horizontal frequency which are substantially rectangular in waveform as indicated by the curves 23(5) of Figures 3*a* and 4*a*. As stated above, the duration of these pulses is adjusted to approximately 0.07 H. These notching impulses perform a very vital function in the generation of the final waveform, in that they trim the leading edges of all the synchronizing impulses so that in the final waveform all timing edges are formed by the trailing edge of the DH or double horizontal notching impulse from tube V—23.

Figure 2C:
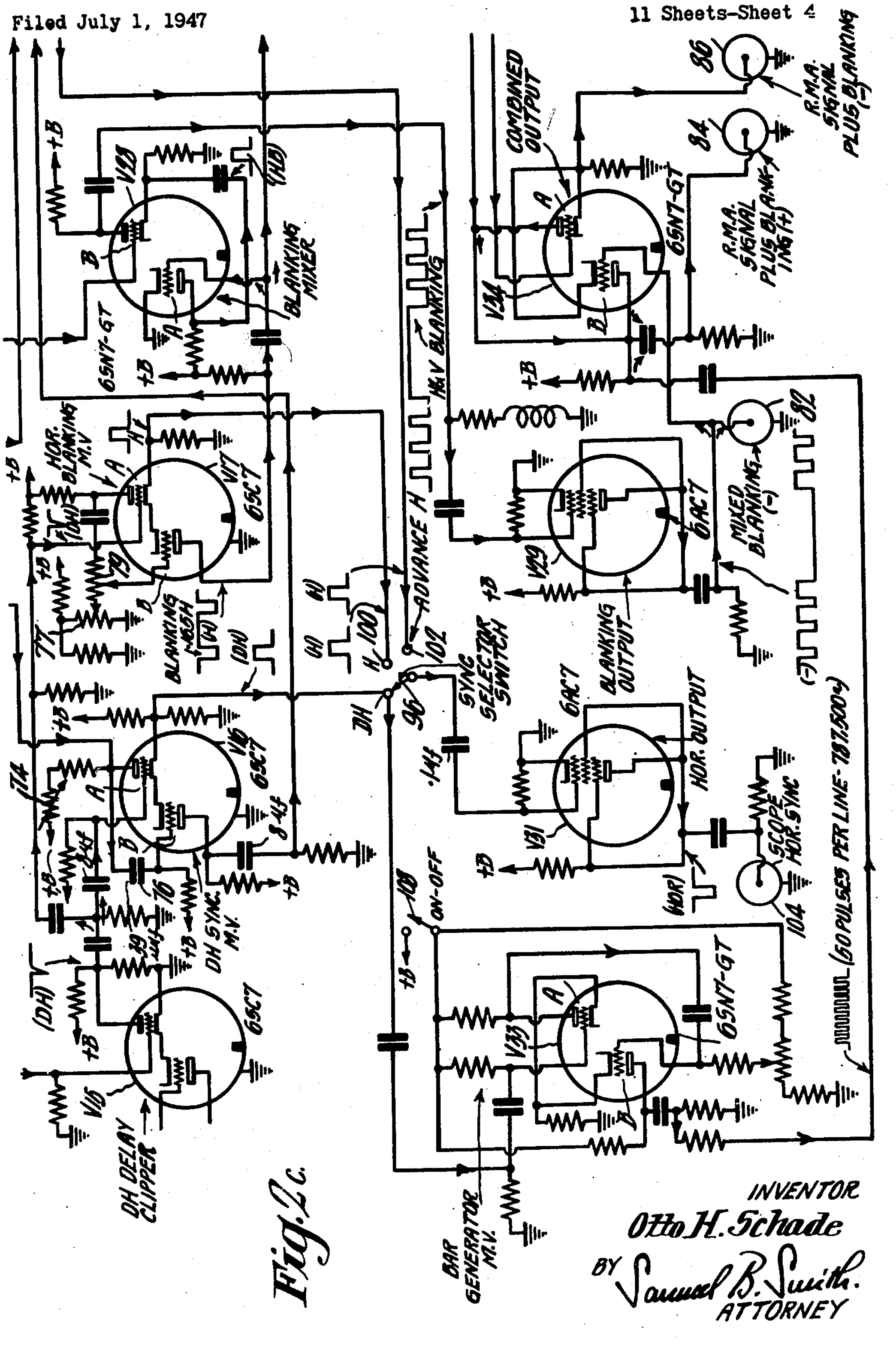
Figure 2A:
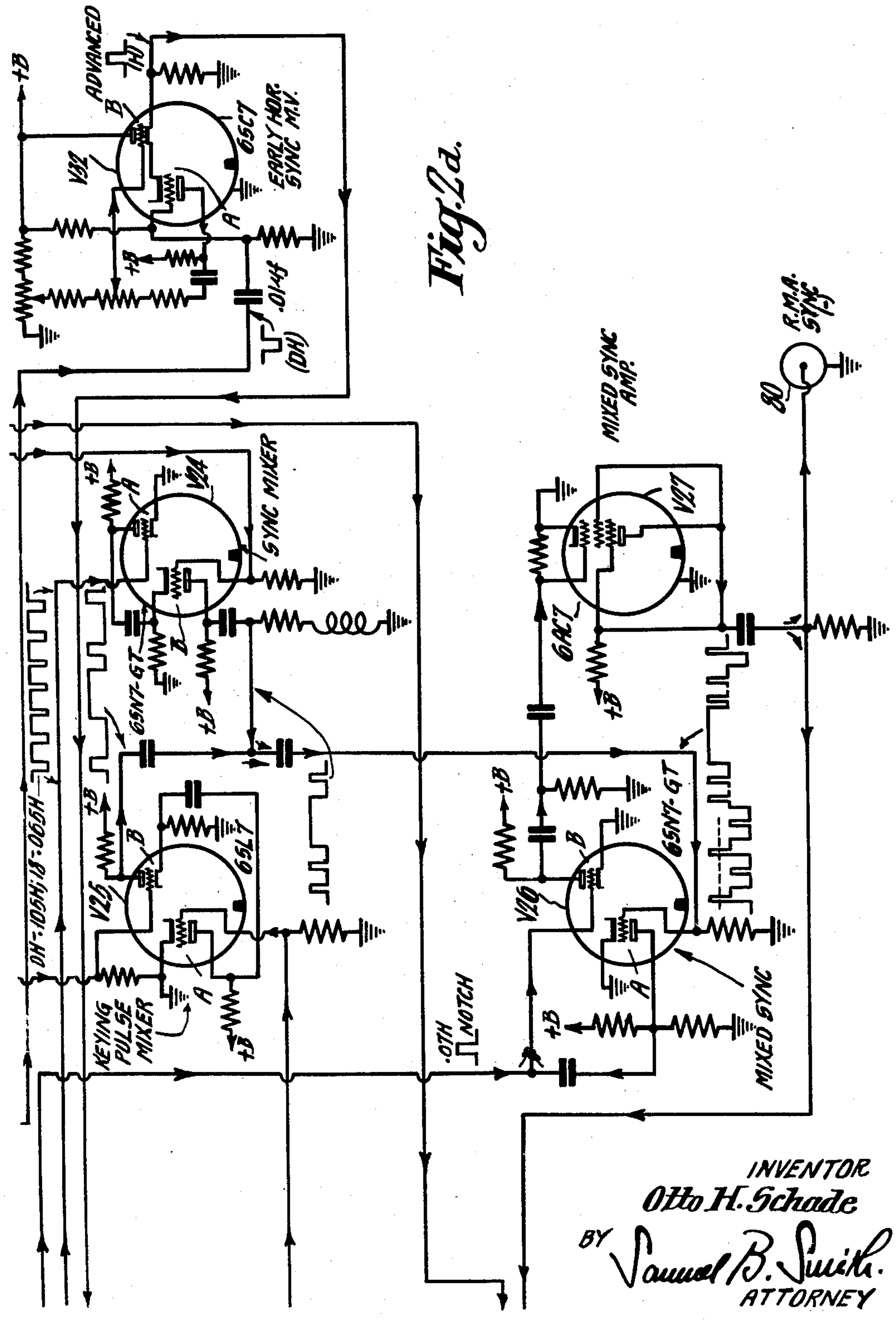

The master impulses from section A of the tube V—2, which are represented by the waveforms 2(3) in Figures 3*a* and 4*a*, are also applied to a double horizontal frequency delay multivibrator tube V—14 (Figure 2*a*). From the anode of section B of this tube is then available negative impulses of double the horizontal deflection frequency, the impulses having a time duration of 0.045 H. This particular duration of the voltage variation is determined by an adjustment of the resistance 70 associated with the delay multivibrator V—14. The waveform available at this point is represented by the solid curve 14(2) of Figure 4*a*. This series of impulses is transmitted through a relatively small condenser 72 in order to differentiate the voltage variation to produce a resulting voltage variation similar to that shown at 14(2) of Figure 3*b* and as also indicated by the dotted portion of curve 14(2) of Figure 4*a*. This differentiated voltage variation shown at 14(2) of Figure 3*b* is then applied to a double horizontal frequency delay clipper tube V—15 (Figure 2*c*). This tube is so biased, by proper choice of grid resistance and plate voltage, that the tube responds only to the most positive excursions of the differentiated voltage variation, as, for example, that portion above the dotted horizontal line associated with curves 14(2) of Figures 3*b* and 4*a*. This results, therefore, in the anode circuit of tube V—15 as series of negative pulses of double horizontal deflection frequency have a waveform as indicated, for example, by the curves 15(5) of Figures 3*b* and 4*a*. This series of impulses is supplied to tubes V—16 and V—17 (Figure 2*c*), both of which are multivibrators, the former supplying double horizontal deflection frequency synchronizing impulses (modulated) and the latter supplying the horizontal blanking signals.

The synchronizing signal multivibrator V—16, when triggered by negative impulses supplied from tube V—15 generates a series of negative impulses available at the anode of section B of that tube. These negative impulses having a waveform such as indicated at 16(2) of Figures 3*b* and 4*a*. Under normal circumstances the duration of these impulses is adjusted to 0.105 H by means of resistance 74, operating in conjunction with condensers 76 and 78 for the generation of the desired waveform. The time duration of these impulses is cyclically altered or modulated, however, so that for an interval corresponding to 9 H the duration of the impulses is made less. The 9 H interval corresponds to the aggregate of time consumed for the transmission of the equalizing impulses that both precede and follow the vertical sync pulse as well as the interval of the vertical sync pulse, per se. This modulation of the time duration of the impulses represented by curves 16(2) in Figures 3*b* and 4*a* is accomplished by the action of a sync modulator, which is section A of tube V—23 (Figure 2*a*). This tube acts as an electron switch to effectively change condenser 78 from an alternating current impedance to a load element requiring a direct current charge to be supplied by the anode of section A of tube V—16. When section A of tube V—23, the sync modulator, is in a conducting condition it effectively connects condenser 78 in parallel with condenser 76, for a direct current charge, requiring thus a greater charging current and thereby altering the parameters (time constant and charging time) associated with the multivibrator tube V—16 to increase the duration of the impulses supplied thereby. Section A of tube V—23, the sync modulator, therefore, operates as a grid controlled diode. When both of condensers 76 and 78 are effectively in the circuit for receiving a charge the duration of the negative impulses from the anode of section B of tube V—16 is approximately 0.105 H but during both equalizing intervals, as well as during the vertical sync interval, the condenser 78 is for all practical purposes ineffective as a time constant element in the multivibrator circuit and the duration of the impulses is reduced to the order of 0.065 H. This keying in and out of condenser 78 by the sync modulator, section A of tube V—23, is accomplished by applying a negative pulse of 9 H duration to the control electrode of that tube. This pulse is derived from tube V—20 (Figure 2*b*) and the waveform applied to the sync modulator tube V—23 is represented by curves 20(2) of each of Figures 3*a* and 4*a*. Accordingly, it may be seen that the normal duration of the negative pulses from tube V—16 is approximately 0.105 H whereas during the 9 H interval of curve 20(2) the duration is reduced to 0.065 H.

So far as the function of section A of tube V—23 is concerned in its relation to the operation of the multivibrator including tube V—16, this arrangement is capable of performing functions different from that ascribed thereto in connection with the television sync generator as shown and described herein. The multivibrator including the circuit arrangement associated with tube V—16 functions at a predetermined constant rate as determined by the frequency of the triggering impulses applied thereto. From the anode of section B of tube V—16 (as well as from the common cathode of both sections of the tube) are available a series of impulses corresponding to the frequency of the applied triggering impulses. The duration of the impulses supplied by the multivibrator tube V—16 are, however, a function of the parameters of the circuit and more specifically are a function of the effective size of the condenser 76 and any condenser, such as condenser 78 associated therewith. In the above description, section A of tube V—23 is keyed into or out of conduction by a pulse obtained from the anode of section B of tube V—20. This pulse is of negative polarity and is of sufficient intensity to render section A of tube V—23 non-conducting. During the remaining portion of the cycle this section of tube V—23 is fully conducting and for this reason it was referred to as a synonymous to a keyed diode. The change in conducting condition of section A of tube V—23 from one extreme to the other produces (with the chosen parameters) a change in pulse duration of from 0.065 H. to 0.105 H as available from the multivibrator tube V—116. If a modulating potential were applied to the control electrode of section A of tube V—23, such that different and varying degrees of conductivity could be established, then the extent of the effect of condenser 78 could be altered and pulse lengths of intermediate duration would be available. Accordingly, if audio signals (i. e., speech, music, etc.) were applied to the control electrode of section A of tube V—23 the pulse length, as available from the multivibrator, would be varied between the two extreme limits in accordance with the characteristics of section A of tube V—23 and in accordance with the signals applied thereto. Such an arrangement, therefore could be used in a circuit for producing variable pulse time modulation and if the pulses occurred at a sufficiently high frequency they could be transmitted with the pulse length representing the information to be conveyed or transmitted. The particular arrangement, therefore, for modulating the length of the pulse available from the multivibrator tube V—16 is subject to a diversification of application as suggested above.

The horizontal blanking multivibrator tube V—17 (Figure 2*c*) is of the free running type. The potentiometer 77 controls the natural frequency of operation and potentiometer 79 controls the length or duration of the pulses supplied thereby. The multivibrator is locked in or triggered in response to negative impulses of double horizontal deflection frequency, and produces blanking impulses of negative plurality of one-half the trigger impulse frequency and of a duration of 0.165 H. The frequency of these pulses therefore, corresponds to the horizontal deflection frequency. These voltage variations of line or horizontal deflection frequency and of 0.165 H duration are represented by the curves 17(2) in Figures 3*b* and 4*a*.

As just explained, the horizontal blanking multivibrator tube V—17 (Figure 2*c*) supplied the horizontal blanking impulses, and as explained previously, tube V—21 (Figure 2*a*) supplies the vertical blanking impulses. These two series of impulses are mixed to produce the entire blanking series, as will be explained later.

The horizontal blanking impulse of negative polarity from tube V—17 (Figure 2*c*) are applied to the control electrode of section A of the keying pulse mixer tube V—25 (Figure 2*d*) while at the same time a negative impulse of approximately 9 H duration obtained from tube V—20 (Figure 2*b*) is applied to the control electrode of section B of this same tube V—25. The positive impulse present at the anode of section A, corresponding to the horizontal blanking impulses, are used to modulate the cathode of section B of tube V—25 so that a mixing of the horizontal blanking and the 9 H pulse will result and appear as positive impulses at the anode of section B of tube V—25. This waveform is represented at 25(5) of Figures 3*b* and 4*a*. It will be observed that in the mixing of these impulses the biasing of the tube is so adjusted that during the 9 H interval no pulses occur at horizontal deflection frequency. An example of a mixer of this type is shown and described in my U. S. Patent No. 2,363,809, issued on November 28, 1944.

As previously explained, horizontal synchronizing impulses (with modulated impulses for a 9 H interval) are developed by tube V—16 (Figure 2*c*) and are represented by curves 16(2) of Figures 3*b* and 4*a*. Furthermore, pulses corresponding to the vertical synchronizing impulses are developed by the vertical sync multivibrator V—22 (Figure 2*b*) and this waveform is represented at curve 22(2) of Figure 3*a*. It is now desired to mix these two series of impulses and for this purpose the horizontal synchronizing impulses are applied to the control electrode of section A of the sync mixer tube V—24 (Figure 2*d*). The resulting and corresponding positive impulses from the anode of this section are then used to modulate the cathode of section B of tube V—24 and to the control electrode of this section are applied negative impulses of vertical or field deflection frequency and of a duration of approximately 3 H from tube V—22. The mixing action performed by tube V—24 then produces at the anode of section B a series of positive impulses as indicated at 24(2) of Figures 3*b* and 4*a*. It will be observed by an inspection of the curves 24(2) of Figures 3*b* and 4*a* that the series of positive impulses are of three different widths or time durations. Normally the pulses are of a time duration of 0.105 H. During the vertical sync interval the impulse length is slightly greater than 3 H as determined by the voltage variation represented by the curve 22(2). During the 3 H intervals that precede and follow the vertical sync interval, the pulse duration is 0.065 H because of the pulse modulation of the voltage variation represented by curve 16(2). The impulses of the voltage variation represented at 24(2), therefore, correspond to the horizontal synchronizing impulses, the vertical synchronizing impulse and the six equalizing impulses that both precede and follow the vertical synchronizing impulse. The impulses representing the horizontal synchronizing impulses are, however, of double horizontal frequency.

In order to convert the double horizontal frequency of the pulses representing the horizontal synchronizing impulses to a frequency corresponding to the horizontal deflection rate, the voltage variations represented by curve 25(5) are added to the voltage variations represented by curve 24(2). This simple addition of voltage variations, both of positive plurality, results in a waveform such as represented at 26(1) in Figures 3b and 4b. This voltage variation is then applied to the control electrode of section A of a sync clipper tube V—26, Figure 2d.

The bias of section A of tube V—26, as determined by its grid resistance, is such that a clipping action occurs approximately at the horizontal dotted line associated with curves 26(1) of Figures 3b and 4b. By this clipping action and by the resulting amplification afforded by the tube, a voltage variation is present at the anode of section A of tube V-26 similar to that represented by the curve 26(2) shown in each of Figures 3b and 4b. The impulses of this voltage variation are of a negative polarity and correspond somewhat to the voltage variation represented by curve 24(2), but differs therefrom, both in polarity and in that the horizontal synchronizing impulses occur at horizontal deflection frequency rather than at double horizontal deflection frequency. This waveform closely approaches the RMA sync signal since the correct number of impulses corresponding to the equalizing impulses that occur both before and immediately following the vertical sync pulse have been added; also the vertical sync pulse, per se, is present, except that it has not yet been slotted.

For ease of comparison, the notching impulses (curve 23(5) of Figure 3a) produced by the notching multivibrator tube V—13 (Figure 2a) and the clipper portion B of tube V—23 have been reproduced in Figure 3b as curve 23(5) and appear beneath curve 26(2). These notching impulses of positive plurality are added to the impulses of negative plurality represented by the curve 26(2). The function of the notching impulses is to trim off the front edges of all the impulses of the waveform represented at 26(2) so that the resulting front edges of all impulses are in alinement with the trailing edges of the notching impulses represented at 23(5). Furthermore, these notching impulses provide the required slotting (six slots at double horizontal frequency) of each vertical sync pulse. By referring now particularly to Figure 4, it may be seen that the notching impulses of curve 23(5) overlap the horizontal synchronizing impulses represented in curve 26(2) by an amount corresponding to approximately 0.025 H. This degree of overlapping also corresponds to the time duration of the "front porch" associated with each horizontal synchronizing impulse as prescribed by the RMA standards (see Figure 5d). Furthermore, the time duration of the notching impulse (0.07 H) is identical to the specified duration of the slots in each vertical sync pulse.

The simple addition of the negative impulses represented by curve 26(2) to the positive notching impulses represented by the curve 23(5) producing a peculiarly shaped curve indicated in Figures 3b and 4b at 26(4). Only the most negative excursions of this particular waveform are desired, however, and to separate the negative excursions from the remainder of the voltage variation of curve 26(4) this waveform is applied to the control electrode of section B of tube V—26 for reversal of polarity so that clipping may be performed and the signal amplified, in the line driver or sync amplifier tube V—27 (Figure 2d). The bias of this tube (V—27) is such that practically no current flows through this section of the tube except during the most positive excursions, which correspond to those portions below the horizontal dotted line associated with curve 26(4) before potential reversal by tube V—26. When tube V—27 is rendered conducting during the intervals appearing as negative excursion of curve 26(4) a negative pulse is available from the anode of tube V—27 to produce a waveform such as indicated at 27(8) of Figures 3c and 4b. This waveform is then the presently required RMA sync signal. A comparison of this waveform with the RMA standards as shown in Figures 5a, 5b, 5c and 5d will reveal the accuracy of the produce voltage variation, these figures showing also the acceptable tolerances.

This voltage variation, represented by curve 27(8), is in full compliance with the RMA sync signal since the horizontal synchronizing impulses have a duration of 0.08 H, six equalizing impulses of double horizontal frequency and of a duration of 0.04 H precede the vertical synchronizing signals, the vertical synchronizing signals have a duration of 3 H and is provided with six slots, each of a duration of 0.07 H and six further equalizing impulses of double horizontal frequency follow the vertical synchronizing impulses, these equalizing impulses also have a duration of 0.04 H. Subsequent to the termination of these final equalizing impulses the horizontal synchronizing impulses begin again. It will be observed that the leading edges of all horizontal synchronizing impulses and all equalizing impulses are in proper phase relationship as determined by the regularly recurring notching impulses of waveform 23(5). Furthermore, it will be observed that the trailing edges of the slots in the vertical sync impulses are similarly determined in phase relationship by the same series of notching impulses. All timing edges of all synchronizing, equalizing and slotting impulses coincide with and are determined by the trailing edges of the regularly recurring notching impulses of double horizontal deflection frequency.

As stated above, the horizontal blanking pulse is developed by the horizontal blanking multivibrator tube V—17 (Figure 2c) and negative impulses of line deflection frequency as represented at 17(2) are available from this tube. It was also pointed out that vertical blanking multivibrator tube V—21 (Figure 2a) supplied negative pulses of field frequency as indicated by curve 21(2). Compositive blanking including both horizontal and vertical impulses may then be obtained by mixing these two signals and this is accomplished in the blanking mixer tube V—28 (Figure 2c). The negative polarity blanking impulses of horizontal deflection frequency, as represented by curve 17(2), are applied to the control electrode of section A of tube V—28 to produce at the anode thereof similar positive impulses which are utilized to modulate the cathode of section B of this tube. Simultaneously, negative polarity vertical blanking impulses, as represented by curve 21(2), are applied to the control electrode of section B of tube V—28 so that a mixing of the two blanking signals may result to thereby make available a mixed blanking signal of positive polarity from the anode of section B of tube V—28. The waveform of the voltage variation obtainable at the point is represented by curve 28(5) of Figure 3c. These blanking impulses for both horizontal and vertical blanking are then amplified (and clipped to assure rectangularity) by the action of the blanking line driver tube V—29 (Figure 2c). The polarity of the signals from this tube is reversed so that there is available from the blanking output tube V—29 the composite or mixed blanking signal of negative polarity as indicated by the curve 29(8) of Figure 3c. This waveform is available at output terminal 82 and has the timing accuracy required by the RMA specifications for the blanking signal.

There are instances when a voltage variation including both horizontal and vertical blanking together with the RMA sync signal is desirable and for producing such a voltage variation a combined output tube V—34 (Figure 2c) is employed. The complete RMA sync signal represented by curve 27(8) is applied to the control electrode of section A of the combined output tube V—34, while the mixed blanking signal represented by the waveform 29(8) is applied to the control electrode of section B of this tube V—34. It will be observed that the cathodes of both sections of this tube are connected together and that likewise the anodes of both sections of the tubes are connected together. The tube, therefore, adds the RMA sync signal to the mixed blanking signal to produce the RMA sync signal plus both horizontal and vertical blanking. This voltage variation is available in positive polarity from the anodes of the combined output tube V—34 and the curves 34(2) of Figures 3c and 4b represent such a waveform. This voltage variation is made available at output terminal 84. The same voltage variation but of negative polarity is also available from the cathodes of the combined output tube V—34 and, for obtaining the negative polarity RMA sync signal plus blanking, output terminal 86 as provided. (For such output, the stripe generator and bar generator, later to be discussed, must be inoperative.)

In the transmission of television programs certain monitoring equipment is employed and among this equipment is invariably included an oscilloscope for observing the amplitude of the video signal, and as an index of shading, gamma, and various other factors. The horizontal sweep of the oscilloscope is generally linear and it is preferable that this rate be adjustable or selectable so that either a sweep deflection corresponding to the television horizontal deflection rate H may be employed, or a deflection corresponding to half this rate may be employed, in order that one or two full lines of the television signal may be presented on the screen of the oscilloscope at the choice of the operator.

It is also desirable to have some choice or selection in the phase relationship of the synchronizing impulses for the oscilloscope as compared with the deflections in the television pickup tube. In the present circuit arrangement provision is made whereby the oscilloscope may be synchronized by impulses having different frequencies and different phase relationships. The same situation is true with respect to synchronizing impulses of field or vertical deflection frequency and impulses of this frequency are also available in different phase relationships.

As indicated above, tube V—20 (Figure 2b) supplies, from the anode of section B, a waveform such as indicated at 20(2). This waveform includes pulses of a duration of substantially 9 H that begin at a time coinciding with the vertical blanking impulses. Voltage variations of this same waveform but of positive polarity are available from the common cathodes of both sections of tube V—20. This voltage variation of positive polarity is indicated, for example, by the curve 20(6) of Figure 3c. This voltage variation is applied to one terminal 88 of a single-pole double-throw switch 90 (Figure 2b).

The vertical sync multi-vibrator tube V—22 (Figure 2b), as explained above, supplies from the anode of section B of that tube a series of negative impulses of vertical or field deflection frequency having a duration of approximately 3 H as indicated by the curve 22(2) of Figure 3a. These impulses begin at a time substantially coinciding with the vertical sync pulse. From the common cathodes of both sections of tube V—22 is available a similar voltage variation of positive polarity and this voltage variation is applied to the other terminal 92 of the single-pole double-throw switch 90. This voltage variation is indicated by the curve 22(6) of Figure 3c.

For increasing the amplitude of the one or the other of these voltage variations an oscilloscope vertical sync amplifier tube V—30 is provided. Positive impulses of the one or the other of the two wave forms indicated at 20(6) or 22(6) are applied to the control electrode of this tube and similar voltage variations of substantially rectangular waveform and of negative polarity are available from the anode of this tube. These voltage variations are applied to terminal 94 in order that they may be made available for synchronizing a monitoring oscilloscope at vertical or field deflection frequency. By a manipulation of switch 90 the phase relationship of the available oscilloscope sync pulses may be altered as is apparent from an inspection of the curves of Figure 3c.

For synchronizing the oscilloscope at horizontal or line deflection rate three selections of waveform are available and to make this selection switch 96 (Figure 2c) is provided. This is a single-pole three-position switch. One of the series of impulses is of double horizontal deflection rate and is obtained from the double horizontal multivibrator tube V—16. This tube, as indicated above, supplied from the anode of section B the modulated double horizontal blanking impulses as indicated at 16(2). A similar voltage variation of positive polarity is available from the common cathodes of both sections of tube V—16 and this voltage variation is represented by curve 16(6) of Figure 3c. In order that this voltage variation may be used as one of the sources for oscilloscope synchronizing, the voltage variation is applied to terminal 98 of switch 96.

The horizontal blanking multivibrator V—17 supplies, from the anode of section B, blanking impulses of horizontal line deflection frequency as indicated by the curve 17(2) of Figure 3b. This same voltage variation of positive polarity is available from the common cathodes of both sections of this tube and this voltage variation is made available for oscilloscope synchronizing by being applied to terminal 100 of switch 96.

The waveform of this voltage variation is represented by the curve 17(6) of Figure 3c.

It will be noticed, especially from an inspection of curve 16(2) and 17(2) of Figure 3b, that the voltage variations applied to both of terminal 98 and 100 begin at the same instant (coinciding with horizontal blanking) and are different from each other (aside from their duration) in that their frequencies are different; the one applied to terminal 98 being of twice horizontal rate while the one applied to terminal 100 is of horizontal or line deflection rate. It is sometimes advantageous to trigger the monitoring oscilloscope a little in advance of the triggering provided by the impulses available at terminal 100 (which coincides with the beginning of horizontal blanking) and for this purpose an advanced synchronizing impulse is made available through the provision of an early horizontal oscilloscope synchronizing multivibrator tube V—32 (Figure 2d). This tube is supplied with impulses of double horizontal frequency from the master oscillator buffer tube V—2 and the applied impulses have a waveform, as indicated by curves 2(3) of Figures 3a and 4a. As a result of the application of these trigger impulses there is available from the common cathodes of the multivibrator tube V—32 a series of impulses of positive polarity and of horizontal deflection rate (since tube V—32 responds only to alternate impulses thereto) and this voltage variation is indicated at curve 32(6) of Figure 3c. Since the leading edge of these impulses coincide with the leading edge of the master impulses they are advanced with the respect to the impulses available at terminal 100 of switch 96 by 0.045 H (see curve 14(2) of Figure 4a). These voltage variations of horizontal deflection rate and of advanced phase are applied to terminal 102 of switch 96.

For amplifying any one of the selected oscilloscope synchronizing impulses of line or double line deflection frequency, an amplifier tube V—31 (Figure 2c) is provided so that there is available at the anode of this tube, and at the output terminal 104, an oscilloscope synchronizing impulse of negative polarity having a frequency, waveform, and phase relationship as indicated by curves 16(6), 17(6) and 32(6) of Figure 3c, depending upon the position of switch 96.

At a television transmitter it is also frequently desirable for the purpose of checking linearity of deflection or for other purposes, to have some provision whereby a pattern of vertical or horizontal bars may be presented on the viewing screen of a monitoring kinescope.

The present invention includes a circuit arrangement for the generation of signals for producing these bars so that the control electrode of the monitoring kinescope may be modulated by the generated bar signals, available directly from the sync signal generator. Since the bar signals are available from the sync signal generator they may readily be so controlled in frequency as to be harmonically related to the deflection rates of the system. For producing a series of horizontal bars, for example, a stripe amplifier, section B of tube V—18 (Figure 2b) is provided, and the control electrode of this tube is supplied with a series of positive impulses from the 15 step counter tube V—8 of the frequency dividing network. These impulses are of a frequency of 900 cycles per second and as a result voltage variations of negative polarity and of a frequency of 900 cycles per second are available from the anode of section B of tube V—18. These impulses of negative polarity are then superimposed upon the output from the combined signal output tube V—34 (Figure 2c) so that they are added to the RMA sync signal plus blanking that is available from output terminal 84. In order that the 900 cycle stripe or bar signal (which produces a series of horizontal bars on a monitoring kinescope) may be made available or discontinued at will, a switch 106 is provided in the anode circuit of section B of tube V—18 (Figure 2b) to render that section of the tube operative or inoperative. Naturally, when the switch 106 is open to 900 cycle voltage variation is no longer available.

In a similar manner, for producing a series of vertical bars, a bar generator multivibrator tube V—33 (Figure 2c) is provided. To generate vertical bars it is necessary to produce impulses having a frequency of occurrence considerably greater than horizontal deflection frequency but harmonically related thereto in order that the bars will remain stationary and be vertical. The parameters of the bar generator multivibrator tube V—33 are such, that, for example, 50 impulses are provided for each television line scanned on the monitoring kinescope. This multivibrator is supplied with positive impulses of double the horizontal deflection rate from the common cathodes of the double horizontal sync multivibrator tube V—16. In response to these DH triggering impulses, the multivibrator tube V—33 produces 25 impulses for each received impulse, the produced high frequency impulses being available at the anode of section B of this tube. If 50 impulses are to be generated for each television line interval, then the bar generator multivibrator will operate at a frequency of the order of 787,500 cycles per second on the basis of the above assumed rate of horizontal deflection. These impulses (having a duration approximately equivalent to the space between them) are, as in the case of the 900 cycle oscillator, made available at output terminal 84 by superimposing the vertical bar signal upon the RMA sync signal plus blanking. Tube V—33, the vertical bar single generator, may be made operative or inoperative by means of switch 108, which functions to energize or de-energize the multivibrator. Rather than synchronize the vertical bar generator tube V—33 from the DH pulses, it might be preferable to use H pulses, i. e., pulses of horizontal deflection frequency. These are available from switch contact 100. When DH pulses from switch contact 98 are used, triggering of the bar generator tube V—33 occurs both at the end of each television line and at approximately the middle of each line. This triggering at the middle of each line might cause a phase shifting of the produced bar signals and thus a disturbance in the regularity of the produced bars. By synchronizing on H pulses during horizontal beam return this is avoided.

Accordingly, when a pattern or image is desired comprising either horizontal or vertical bars, it is only necessary to apply the signal from terminal 84 (either directly or through an amplifier) to the control electrode of a kinescope and the choice of either horizontal or vertical bars depends upon which of switches 106 or 108 is closed.

From the above description it may be seen that a new and improved sync signal generator has been provided from which may be obtained the standard RMA sync signal and from which is also available a signal representing both horizontal and vertical blanking. In addition a mixture of blanking and the RMA sync signal is available. Furthermore, impulses may be obtained from the sync signal generator for producing horizontal or vertical bars or a monitor kinescope. In addition, the monitoring oscilloscope normally associated with a television transmitter may be synchronized by impulses available from the sync generator in various selectable phase relationships.

The sync signal generated by the above described circuit is stable and complies completely with the specifications of the Radio Manufacturers Association. Furthermore, any tendency in the system for phase shifting of the generated impulses is completely overcome in so far as the resulting signal is concerned through the use of a single series of notching impulses which trim the leading edges of all synchronizing impulses in order to assure the proper phase relationship. The sync signal generator described herein, although stable in operation is capabe of considerable diversification in frequency of operation and, by proper adjustment of certain parameters, frequencies different from those indicated above and from those now in conventional use may be readily generated.

What is claimed is:

1. A television synchronizing signal generator comprising, a master oscillator for generating impulses of double horizontal deflection frequency, a divider network responsive to the double horizontal deflection frequency impulses for producing impulses of vertical deflection frequency and having a duration corresponding to an interval occupied by approximately two impulses of double horizontal deflection frequency, means including a first oscillator responsive to the first of the impulses of double horizontal deflection frequency that occurs concomitantly with the impulses of vertical deflection frequency to produce an equalizing interval impulse having a duration approximately equal to the duration of six impulses of double horizontal deflection frequency, means including a second oscillator and a differentiating network for producing a vertical sync impulse of vertical deflection frequency, also of a duration corresponding to approximately six impulses of double horizontal deflection frequency and immediately following the equalizing interval impulse, a third oscillator responsive to the impulses of vertical deflection frequency and the first concomitant impulse of double horizontal deflection frequency for producing an impulse of vertical deflection frequency and having a duration corresponding approximately to the duration of eighteen impulses of double horizontal deflection frequency, means for combining the last produced impulse with the vertical sync impulse and with impulses of double horizontal deflection frequency to produce a composite series of impulses, means responsive to the impulses of double horizontal deflection frequency to produce a series of notching impulses of the same frequency but of a predetermined time duration, means to combine the notching impulses with the composite series of impulses to trim the leading edges of all the impulses of the composite series of impulses, and to slot the vertical sync impulse, and means including a voltage limiting device to produce a series of impulses for television synchronizing impulses corresponding to the peak potential excursions of the trimmed composite series of impulses in a predetermined potential direction.

2. A television synchronizing signal generator comprising, a oscillator for generating impulses of double horizontal deflection frequency, a divider network responsive to the impulses of double horizontal deflection frequency for producing a series of impulses of vertical deflection frequency, means including a second oscillator responsive to the first of the impulses of double horizontal deflection frequency that occurs concomitantly with the impulses of vertical deflection frequency to produce a second series of impulses having a duration approximately equal to the duration of six impulses of double horizontal deflection frequency, means including a third oscillator and a differentiating network for producing a third series of impulses of vertical deflection frequency, also of a duration corresponding to approximately six impulses of double horizontal deflection frequency, and immediately following the second produced series of impulses, a fourth oscillator responsive to the impulses of vertical deflection frequency and the first concomitant impulse of double horizontal deflection frequency for producing a fourth series of impulses of vertical deflection frequency and having a duration corresponding approximately to the duration of eighteen impulses of double horizontal deflection frequency, means for combining the produced third and fourth series of impulses with variable length impulses of double horizontal deflection frequency to produce a composite series of impulses, means responsible to the impulses of double horizontal deflection frequency to produce a series of notching impulses of the same frequency but of a predetermined time duration, means to combine the notching impulses with the composite series of impulses to trim the leading edges of all the impulses of the composite series of impulses, and means to produce a series of impulses for television synchronizing purposes corresponding to the peak potential excursions of the trimmed composite series of impulses in a predetermined potential direction.

3. A television synchronizing signal generator comprising, a source of impulses of double horizontal deflection frequency, a network responsive to the double horizontal deflection frequency impulses for producing impulses of vertical deflection frequency having a duration corresponding to an interval occupied by at least two impulses of double horizontal deflection frequency, means including a first oscillator responsive to the first of the impulses of horizontal deflection frequency that occurs concomitantly with the impulses of vertical deflection frequency to produce a first series of impulses having a predetermined duration, means including a second oscillator and a differentiating network for producing a second series of impulses of vertical deflection frequency and of a predetermined duration and immediately following the impulses of the first produced series of impulses, a third oscillator responsive to the impulses of vertical deflection frequency and the first concomitant impulse of double horizontal deflection frequency for producing a third series of impulses of vertical deflection frequency and having a different predetermined duration, means for combining all of the above named second and third series of impulses with impulses of double horizontal deflection frequency to produce a composite series of impulses, means responsive to the impulses of double horizontal deflection frequency to produce a series of notching impulses of the same frequency but of a predetermined time duration, means to combine the notching impulses with the composite series of impulses to thereby trim the leading edges of all the impulses of the composite series of impulses, and means including a voltage limiting device to produce a series of impulses for television synchronizing purposes corresponding to the peak potential excursions of the trimmed composite series of impulses in a predetermined potential direction.

4. A television sync signal generator for producing a television sync signal waveform including horizontal sync impulses, equaling impulses, and slotted vertical sync impulses comprising a source of impulses of double horizontal deflection frequency, a network responsive to the impulses of double horizontal deflection frequency for producing impulses of vertical deflection frequency, two separate oscillators responsive to each impulse of vertical deflection frequency and the first concomitant impulse of double horizontal deflection frequency for producing two series of impulses of vertical deflection frequency, the developed impulses commencing substantially at the same instant but having different durations corresponding approximately to the duration of six impulses of double horizontal deflection frequency and eighteen impulses of double horizontal deflection frequency, respectively, means including an oscillator and a differentiating network for producing a third series of impulses of vertical deflection frequency each impulse starting immediately following the termination of the first of the two above named series of impulses and continuing for an interval corresponding approximately to the duration of six impulses of double horizontal deflection frequency, means to combine the second and third series of impulses of vertical deflection frequency with impulses of double horizontal deflection frequency to produce a composite series of impulses, means responsive to the impulses of double horizontal deflection frequency for producing a series of notching impulses of double horizontal deflection frequency and of a predetermined duration, means to combine the notching impulses with the composite series of impulses to trim the leading edges of all of the impulses of the composite series of impulses, and means responsive to the peak voltage excursions in a predetermined polarity direction whereby an accurately phased television sync signal may be provided.

5. A television sync signal generator for producing a waveform including horizontal sync impulses, equaling impulses, and slotted vertical sync impulses comprising a source of impulses of double horizontal deflection frequency, a divider network responsive to the impulses of double horizontal deflection frequency for producing impulses of vertical deflection frequency, two separate oscillators responsive to each impulse of vertical deflection frequency and the first concomitant impulse of double horizontal deflection frequency for producing a first and second series of impulses of vertical deflection frequency, both series of impulses commencing substantially at the same instant but having different durations corresponding substantially to the duration of six impuses of double horizontal deflection frequency and eighteen impulses of double horizontal deflection frequency, respectively, means including an oscillator and a differentiating network for producing a third series of impulses of vertical deflection frequency each impulse starting immediately following the first of the above named series of impulses and continuing for an interval corresponding approximately to the duration of six impulses of double horizontal deflection frequency, means to combine the third series of impulses with impulses of double horizontal deflection frequency to produce a fourth series of impulses, means to combine the second series of impulses with impulses of horizontal deflection frequency to produce a fifth series of impulses, means to combine the fourth and fifth series of impulses to produce a composite series of impulses, means responsive to the impulses of double horizontal deflection frequency for producing a series of notching impulses of double horizontal deflection frequency and of a predetermined duration, means to combine the notching impulses with the composite series of impulses to trim the leading edges of all of the impulses of the composite series of impulses and to notch the impulses produced by the third oscillator, and means responsive to the peak voltage excursions in a predetermined polarity direction whereby an accurate phased television sync signal may be provided.

6. A television sync signal generator for producing a television sync signal waveform including horizontal sync impulses, equaling impulses, and slotted vertical synchronizing impulses comprising an oscillator for producing impulses of double horizontal deflection frequency, a divider network responsive to the impulses of double horizontal deflection frequency for producing short impulses of vertical deflection frequency, two separate multivibrators responsive to each impulse of vertical deflection frequency and the first concomitant impulse of double horizontal deflection frequency for producing a first and second series of impulses of vertical deflection frequency, the developed impulses commencing substantially at the same instant but having different durations corresponding to the duration of six impulses of double horizontal deflection frequency and eighteen impulses of double horizontal deflection frequency, respectively, means including a multivibrator and a differentiating network responsive to the first series of impulses for producing a third series of impulses of vertical deflection frequency each impulse starting immediately following the impulses of the first series of impulses and continuing for an interval corresponding approximately to the duration of six impulses of double horizontal deflection frequency, a source of impulses of horizontal deflection frequency, means to combine the second and third series of impulses with impulses of double horizontal deflection frequency and impulses of horizontal deflection frequency to produce a composite series of impulses, means responsive to the impulses of double horizontal deflection frequency for producing a series of notching impulses of double horizontal deflection frequency and of a predetermined duration, means to combine the notching impulses with the composite series of impulses in a phase and polarity relationship to trim the leading edges of all of the impulses of the composite series of impulses and to notch the impulses produced by the third multivibrator, and means responsive to the peak voltage excursions in a predetermined polarity direction whereby an accurate phased television sync signal may be produced.

7. A television sync signal generator for producing impulses for use in a television transmitting system comprising a source of impulses of double horizontal deflection frequency, means including means responsive to the impulses of double horizontal deflection frequency for producing a series of impulses of vertical deflection frequency, oscillating devices responsive to the last named series of impulses and to the first impulse of double horizontal deflection frequency occurring concomitantly therewith for producing a first and second series of impulses corresponding approximately to the equalizing interval preceding the vertical sync impulse and the interval occupied by the vertical sync impulse and both equalizing intervals, respectively, further means reponsive to the first of these two series of impulses for producing a third series of impulses corresponding to the vertical sync impulse, means for combining impulses of double horizontal deflection frequency with the second and third series of impulses and with impulses of horizontal deflection frequency to produce a series of composite impulses, means responsive to the impulses of double horizontal deflection frequency for producing a series of notching impulses of double horizontal deflection frequency and of a predetermined phase and time duration, means to combine the notching impulses with the composite series to trim the leading edges of all of the impulses of the composite series of impulses, and means for utilizing the peak voltage variations in a predetermined polarity direction of the trimmed composite series of impulses whereby a television sync signal series may be produced.

8. A television sync signal generator for producing a television sync signal series including horizontal sync impulses, slotted vertical sync impulses and equalizing impulses immediately preceding and following the slotted vertical sync impulses, comprising an oscillator for producing a series of impulses of double horizontal deflection frequency, means including divider network responsive to the impulses of double horizontal deflection frequency for producing a series of impulses of vertical deflection frequency, means responsive to the last named series of impulses and to the first impulse of double horizontal deflection frequency occurring concomitantly therewith for producing a first and second series of impulses corresponding approximately to the equalizing interval preceding the vertical sync signal and the interval occupied by the vertical sync signal and both preceding and following equalizing intervals, respectively, further means responsive to the first of these two series of impulses for producing a third series of impulses corresponding to the vertical sync impulse, means for combining impulses of double horizontal deflection frequency with the second and third series of impulses of vertical deflection frequency and to delete alternate impulses of double horizontal deflection frequency except during the intervals of the second series of impulses to produce a composite series of impulses, means responsive to the impulses of double horizontal deflection frequency for producing a series of notching impulses of double horizontal deflection frequency and of a predetermined phase and time duration, means to combine the notching impulses with the composite series of impulses to trim and properly relate in both phase and time the leading edges of all of the impulses of the composite series of impulses and to slot the impulses thereof corresponding to the third series of impulses, and means including a clipping device for utilizing the peak voltage variations of the trimmed composite series of impulses in a predetermined polarity direction whereby a series of television sync signal series may be produced.

9. A television sync signal generator for producing a series of impulses for use in a television transmitter including horizontal sync impulses, slotted vertical sync impulses, and equalizing impulses of double horizontal deflection frequency preceding and following the slotted vertical sync impulses comprising an oscillator for producing impulses of double horizontal deflection frequency, means including a frequency divider network responsive to the impulses of double horizontal deflection frequency for producing impulses of vertical deflection frequency, means responsive to the impulses of vertical deflection frequency and the first concomitant impulse of double horizontal deflection frequency for producing a plurality of series of impulses of vertical deflection frequency and of different time and phase relationship, means responsive to one of the plurality of series of impulses and to impulses of double horizontal deflection frequency for producing impulses of double horizontal deflection frequency but in which the time duration of the impulses is cyclically altered at vertical deflection frequency, means to combine the impulses of double horizontal deflection frequency and of cyclically varying time duration with the produced plurality of series of impulses and with impulses of horizontal deflection frequency to produce a composite series of impulses of approximately the desired waveform and in which the impulses are approximately in the correct time and phase relationship, means responsive to the impulses of double horizontal deflection frequency for producing a series of notching impulses of double horizontal deflection frequency and of a time duration corresponding to the desired slots in the vertical sync impulse, and means to combine the series of notching impulses with the composite series of impulses whereby the leading edges of all of the impulses of the composite series of impulses are trimmed to establish the desired time and phase relationship between the impulses and to slot the vertical sync impulse, and a voltage limiting device for transmitting the peak potential variations of the trimmed composite series of impulses in a predetermined polarity direction whereby the desired sync signal may be produced.

10. A television sync signal generator for producing a series of impulses for use in a television transmitter including horizontal sync impulses, slotted vertical sync impulses, and equalizing impulses preceding and following the slotted vertical sync impulses comprising a source of impulses of double horizontal deflection frequency, means including a frequency divider responsive to the impulses of double horizontal deflection frequency for producing drive impulses of vertical deflection frequency, means responsive to the drive impulses and the first concomitant impulse of double horizontal deflection frequency for producing a plurality of series of impulses of vertical deflection frequency and of different duration and phase relationship, means responsive to one of the plurality of series of impulses and to impulses of double horizontal deflection frequency for producing impulses of double horizontal deflection frequency but in which the time duration of the impulses is cyclically altered at vertical deflection frequency, means to combine the impulses of cyclically varying time duration with certain of the produced plurality of series of impulses to produce a composite series of impulses of approximately the desired waveform, time and phase relationship, means responsive to the impulses of double horizontal deflection frequency for producing a series of notching impulses of double horizontal deflection frequency and of a predetermined time duration, and means to combine the series of notching impulses with the composite series of impulses whereby the leading edges of all of the impulses of the composite series of impulses are trimmed to establish the desired time and phase relationship between the impulses, and a means for transmitting only the peak potential variations of the trimmed composite series of impulses in a predetermined polarity direction whereby the desired sync signal may be produced.

11. A television sync signal generator for producing a series of impulses for synchronizing a television program including horizontal sync pulses, slotted vertical sync pulses and equalizing impulses preceding and following the slotted vertical sync impulses comprising, a master oscillator for producing impulses of double horizontal deflection frequency, means responsive to the impulses of double horizontal deflection frequency for producing impulses of vertical deflection frequency, a pair of multivibrators responsive to the impulses of vertical deflection frequency and to the first concomitant impulse of double horizontal deflection frequency for producing a first and second series of impulses of vertical deflection frequency, the impulses of each series commencing substantially simultaneously and the durations of the impulses corresponding substantially to the interval of six impulses of double horizontal deflection frequency and eighteen impulses of double horizontal deflection frequency, respectively, a multivibrator and a differentiating network responsive to the first of the produced series of impulses for producing a third series of impulses of vertical deflection frequency commencing immediately following the termination of the impulses of the first series of impulses and having a duration corresponding to approximately six impulses of double horizontal deflection frequency, means responsive to the impulses of double horizontal deflection frequency and to the second series of impulses for producing a fourth series of impulses of double horizontal deflection frequency but in which the impulses are pulse time modulated so that the duration of the impulses is cyclically altered at vertical deflection frequency, means to combine the second and third series of impulses of vertical deflection frequency with the pulse time modulated fourth series of impulses and impulses of horizontal deflection frequency to produce a composite series of impulses, means responsive to the impulses of double horizontal deflection frequency to produce a series of notching impulses of double horizontal deflection frequency and of a predetermined time duration, means to combine the notching impulses with the composite series of impulses so that the leading edges of all of the impulses of the composite series of impulses are trimmed to establish a desired phase and relationship, and means for transmitting only the peak potential variations of the trimmed composite series of impulses in a predetermined polarity direction whereby an accurate television sync signal may be produced.

12. A television sync signal generator for producing a series of impulses for synchronizing a television program including horizontal sync pulses, slotted vertical sync pulses and equalizing impulses preceding and following the slotted vertical sync impulses comprising, a source of impulses of double horizontal deflection frequency, means responsive to the impulses of double horizontal deflection frequency for producing impulses of vertical deflection frequency, a pair of oscillators responsive to the impulses of vertical deflection frequency and to the first concomitant impulse of double horizontal deflection frequency for producing a first and second series of impulses of vertical deflection frequency, the impulses of each series commencing substantially simultaneously and the durations of the impulses corresponding substantially to the interval of the six and eighteen impulses of double horizontal deflection frequency, respectively, an oscillator and a differentiating network responsive to the first series of impulses for producing a third series of impulses of vertical deflection frequency having a duration corresponding to approximately six impulses of double horizontal deflection frequency and corresponding to the vertical sync impulse, means responsive to the impulses of double horizontal deflection frequency and to the second series of impulses for producing a fourth series of impulses of double horizontal deflection frequency but in which the duration of the impulses are pulse time modulated so that the duration of the impulses is reduced for the duration of the impulses of the second series of impulses, means to produce a fifth series of impulses of horizontal deflection frequency, means to combine the second, third, fourth and fifth series of impulses to produce a composite series of impulses, means responsive to the impulse of double horizontal deflection frequency to produce a series of notching impulses of double horizontal deflection frequency and of a predetermined time duration, means to combine the notching impulses with the composite series of impulses so that the leading edges of all of the impulses of the composite series of impulses are trimmed to establish a desired phase and relationship and so that alternate ones of the longer impulses of the fourth series of impulses are deleted, and means for selecting only the peak potential variations of the trimmed composite series of impulses in a predetermined polarity direction whereby an accurate television sync signal may be produced.

OTTO H. SCHADE.

REFERENCES CITED

The following references are of record in the file of this patent:

UNITED STATES PATENTS

| Number | Name | Date |
|---|---|---|
| 2,118,626 | Smith | May 24, 1938 |
| 2,166,688 | Kell | July 18, 1939 |
| 2,227,596 | Luck | Jan. 7, 1941 |